(12) United States Patent
Sako et al.

(10) Patent No.: US 7,251,327 B1
(45) Date of Patent: Jul. 31, 2007

(54) DATA TRANSMISSION APPARATUS, DATA TRANSMISSION METHOD, AND DATA RECORDING MEDIUM

(75) Inventors: Yoichiro Sako, Tokyo (JP); Tatsuya Inokuchi, Kanagawa (JP); Masayuki Obata, Tokyo (JP); Shuichi Ito, Tokyo (JP); Kazuko Sakurai, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/581,271

(22) PCT Filed: Oct. 14, 1999

(86) PCT No.: PCT/JP99/05690

§ 371 (c)(1),
(2), (4) Date: Oct. 26, 2000

(87) PCT Pub. No.: WO00/22621

PCT Pub. Date: Apr. 20, 2000

(30) Foreign Application Priority Data

Oct. 14, 1998 (JP) .............................. P10-292049

(51) Int. Cl.
*H04L 9/00* (2006.01)
(52) U.S. Cl. .................. 380/201; 380/252; 726/26
(58) Field of Classification Search ................ 380/252, 380/200–203, 281; 705/408, 410; 369/47.12; 370/395.6; 726/26, 27–33; 379/100.13
See application file for complete search history.

(56) References Cited

U.S. PATENT DOCUMENTS

| | | | |
|---|---|---|---|
| 4,898,059 A | 2/1990 | Iizuka et al. | |
| 5,077,791 A * | 12/1991 | Salihi | 380/270 |
| 5,142,568 A | 8/1992 | Ogata et al. | |
| 5,247,347 A * | 9/1993 | Litteral et al. | 725/114 |
| 5,247,575 A * | 9/1993 | Sprague et al. | 705/53 |
| 5,410,598 A * | 4/1995 | Shear | 705/53 |
| 5,557,541 A * | 9/1996 | Schulhof et al. | 700/94 |
| 5,572,442 A * | 11/1996 | Schulhof et al. | 709/219 |
| 5,654,747 A * | 8/1997 | Ottesen et al. | 725/1 |
| 5,825,883 A * | 10/1998 | Archibald et al. | 705/53 |
| 2001/0042043 A1* | 11/2001 | Shear et al. | 705/51 |

FOREIGN PATENT DOCUMENTS

| | | |
|---|---|---|
| EP | 0 593 305 A2 | 4/1994 |
| EP | 0 643 371 A1 | 3/1995 |
| EP | 0 760 505 A2 | 3/1997 |
| EP | 0 860 823 A1 | 8/1998 |
| JP | 1-113959 | 5/1989 |
| JP | 01113959 | 5/1989 |
| JP | 2-158959 | 6/1990 |

(Continued)

*Primary Examiner*—Kambiz Zand
*Assistant Examiner*—Tongoc Tran
(74) *Attorney, Agent, or Firm*—Lerner, David, Littenberg, Krumholz & Mentlik, LLP

(57) ABSTRACT

A system control circuit 5 determines whether or not an external apparatus connected to an interface 14 is one that can store data, by transmitting data to the apparatus through the interface 14. It the system control circuit 5 determines that the external apparatus can store data, the circuit 5 turns off a switch 13, stopping the transmission of audio data to the external apparatus through the interface 14. As a result, illegal copying of the data can be effectively prevented.

38 Claims, 18 Drawing Sheets

FOREIGN PATENT DOCUMENTS

| | | |
|---|---|---|
| JP | 4-274055 | 9/1992 |
| JP | 6-302092 | 10/1994 |
| JP | 06302092 | 10/1994 |
| JP | 8-339629 | 12/1996 |
| JP | 083396529 | 12/1996 |
| JP | 10-3744 | 1/1998 |
| JP | 10-224752 | 8/1998 |
| JP | 10224752 | 8/1998 |
| WO | WO-98/48387 | 10/1998 |

\* cited by examiner

| COPY PERMISSION DATA | |
|---|---|
| 00 | INHIBIT COPYING |
| 01 | PERMIT FIRST-GENERATION COPYING OF ANALOG SIGNAL ONLY |
| 10 | PERMIT FIRST-GENERATION COPYING OF DIGITAL SIGNAL OR ANALOG SIGNAL |
| 11 | PERMIT ANY GENERATION COPYING OF WHICHEVER TYPE OF A SIGNAL |

FIG.4

| COPY PERMISSION DATA | |
|---|---|
| 000 | INHIBIT COPYING |
| 001 | PERMIT UNI-COPYING AT STANDARD REPRODUCING SPEED ONLY (UNI-COPYING AT HIGHER SPEED IS IMPOSSIBLE) |
| 010 | PERMIT UNI-COPYING AT STANDARD SPEED OR HIGHER SPEED |
| 011 | PERMIT UNI-COPYING AT HIGHER SPEED AND FIRST-GENERATION COPYING AT STANDARD SPEED |
| 100 | PERMIT FIRST-GENERATION COPYING AT STANDARD SPEED OR HIGHER SPEED |
| 111 | PERMIT ANY GENERATION COPYING OF WHICHEVER TYPE OF A SIGNAL, AT WHICHEVER REPRODUCING SPEED |

FIG.8

ND RECORDING MEDIUM

DATA TRANSMISSION APPARATUS, DATA TRANSMISSION METHOD, AND DATA RECORDING MEDIUM

TECHNICAL FIELD

The present invention relates to a data transmitting apparatus, a data transmitting method and a data recording medium and is applied to a compact-disk player, a satellite-broadcasting receiver, and the like. More particularly, this invention has been made to control the transmission of data in accordance with the type of an apparatus to which the data is transmitted or to charge, if necessary, the fee for transmitting data, thereby to prohibit so-called illegal copying of the data.

BACKGROUND ART

Up to this time, electric music distribution (EMD) has been accomplished, thereby distributing music by means of CS satellite broadcasting or through the Internet or the like. Music is distributed as the content provider authenticates each terminal via a network, thus allowing the same to receive music. Fee is charged every time the receiver listens to the music.

Music distribution achieved by using packaged media such as compact disks is, after all, music distribution effected by selling media. Except for special cases, the user can listen to the music as many times he or she wants, once he or she has paid an amount money for the medium and the media has been accordingly distributed to him or her.

A person who has bought a packaged medium can copy the music for his or her private use. Besides such a private copy, there may be distributed so-called pirate copies of the packaged media.

Even in the case of electric music distribution, too, a person who has received the music can copy the music for his or her private use. Besides such a private copy, the receiver may copy the music for illegal use.

DISCLOSURE OF INVENTION

The present invention has been made in view of the foregoing. The object of the invention is to provide a data transmitting apparatus, a data transmitting method and a data recording medium, which can prevent illegal copying of data at a playback apparatus such as compact-disk player and at a network terminal such as satellite-broadcasting receiver.

A data transmitting apparatus according to the present invention comprises: an interface that can be connected to various external apparatuses; external-apparatus identifying means for determining the type of an external apparatus connected to the interface and outputting data representing the type of the external apparatus; and control means for controlling transmission of output data to the external apparatus through the interface, in accordance with the result of determining the type of the external apparatus.

A data transmitting method according to the invention is designed for use in a data transmitting apparatus having an interface that can be connected to various external apparatuses. The method comprising the steps of: determining the type of an external apparatus connected to the interface and outputting data representing the type of the external apparatus; and controlling transmission of output data to the external apparatus through the interface, in accordance with the result of determining the type of the external apparatus.

A data transmitting apparatus according to this invention comprises interfaces of different types and control means for controlling transmission of output data through each interface in accordance with the type of the interface.

A data transmitting method is designed for use in a data transmitting apparatus having interfaces of different types. The method comprises a control step of controlling transmission of output data in accordance with the type of the interface.

A data transmitting apparatus according to the present invention is designed to transmit output data reproduced from a recording medium. This apparatus comprises: an interface for transmitting the output data; and fee-charging control means for performing a fee-charging process in accordance with the transmission of output data through the interface and for controlling the transmission of output data. The fee-charging control means performs the fee-charging process by updating, in accordance with the fee to be charged, data recorded on the recording medium and corresponding to a sum of fees that can be charged for the recording medium. The control means stops the transmission of output data through the interface when the data corresponding to the sum of fees reaches or exceeds a predetermined value.

A data transmitting apparatus according to the invention is designed to transmit output data reproduced from a recording medium. The apparatus comprises: an interface for transmitting the output data; and fee-charging control means for performing a fee-charging process in accordance with the transmission of output data through the interface and for controlling the transmission of output data. The fee-charging control means performs the fee-charging process by sequentially recording data, in accordance with the fee to be charged, in a region provided in the recording medium and corresponding to a sum of fees that can be charged for the recording medium recorded. The control means stops the transmission of output data through the interface when the region corresponding to the sum of fees decreases in size to a predetermined size or becomes smaller than the predetermined size.

A data transmitting method according to this invention is designed for use in a data transmitting apparatus for transmitting, through an interface, output data reproduced from a recording medium. The method comprises: a fee-charging control step of performing a fee-charging process in accordance with the transmission of output data through the interface and controlling the transmission of output data. The fee-charging control step is to perform the fee-charging process by updating, in accordance with the fee to be charged, data recorded on the recording medium and corresponding to a sum of fees that can be charged for the recording medium, and to stop the transmission of output data through the interface when the data corresponding to the sum of fees reaches or exceeds a predetermined value.

A data transmitting method according to the present invention is designed for use in a data transmitting apparatus for transmitting, through an interface, output data reproduced from a recording medium. This method comprises: a fee-charging control step of performing a fee-charging process in accordance with the transmission of output data through the interface and controlling the transmission of output data. The fee-charging control step is to perform the fee-charging process by sequentially recording data, in accordance with the fee to be charged, in a region provided in the recording medium and corresponding to a sum of fees that can be charged for the recording medium recorded, and to stop the transmission of output data through the interface when the region corresponding to the sum of fees decreases in size to a predetermined size or becomes smaller than the predetermined size.

A data recording medium according to the invention records desired data. Data corresponding to a sum of fees that can be charged for accesses to the recording medium is recorded on the medium and can be updated.

A data recording medium according to this invention records desired data. The data recording medium has a region corresponding to a sum of fees that can be charged for accesses to the recording medium. Data can be recorded in the region.

BRIEF DESCRIPTION OF DRAWINGS

FIG. 4 is a diagram showing an example of copy-permitting information;

FIG. 8 is a diagram showing an example of copy-permitting information;

BEST MODE FOR CARRYING OUT THE INVENTION

The data transmitting apparatus, the data transmitting method and the data recording medium, according to the present invention, will be described with reference to the accompanying drawings.

Figure 1:
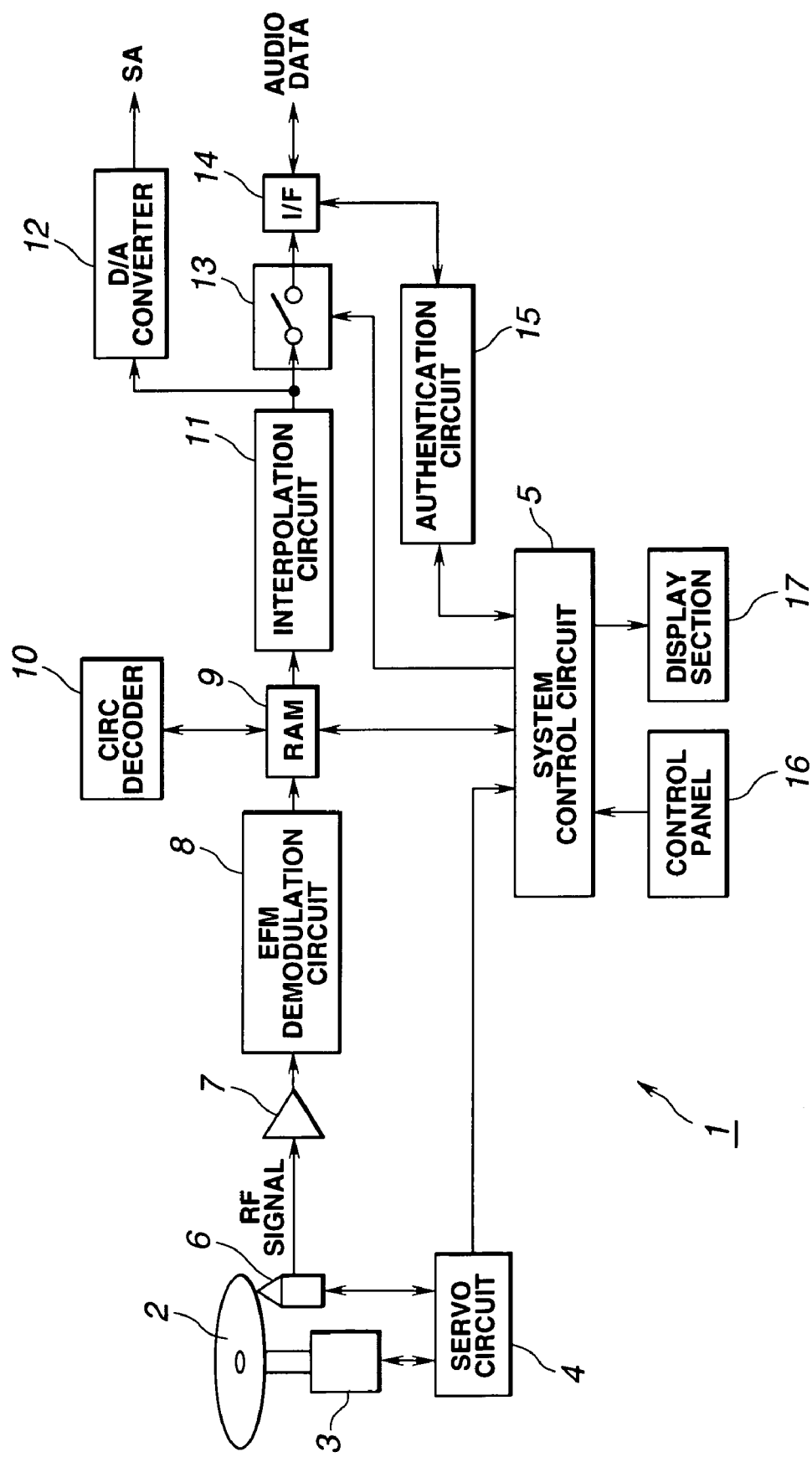
FIG. 1 is a block diagram showing the actual structure of an optical disk apparatus to which the present invention is applied.

FIG. 1 is a block diagram showing the actual structure of an optical disk apparatus to which the present invention is applied and which controls the transmission of audio data in accordance with this type of an external apparatus. As FIG. 1 shows, an optical disk 2 is set in the optical disk apparatus 1. The disk 2 is a packaged medium such as a compact disk (CD), from which data is only reproduced.

In the optical disk apparatus 1, the optical disk 2 is clamped to a shaft by means of a specific clamping mechanism. A spindle motor 3 rotates the optical disk 2 at a predetermined speed under the control of a servo circuit 4.

The servo circuit 4 drives the spindle motor 3 under the control of a system control circuit 5, in accordance with the data reproduced by an optical pickup 6. The servo circuit 4 moves the optical pickup 6 in a radial direction of the optical disk 2 as it is so instructed by the system control circuit 5.

The optical pickup 6 incorporates a semiconductor laser, which emits a laser beam. The laser beam is applied through an objective lens (not shown) to the optical disk 2, converging at the data-recording surface of the disk 2. The optical pickup 6 has a light-receiving element, which receives the beam reflected from the disk 2. The optical pickup 6 generates a tracking error signal, a focusing error signal and the like from the beam the light-receiving element has received. The servo circuit 4 performs tracking servo control and focusing servo control on the objective lens in accordance with the tracking error signal and the focusing error signal.

The optical pickup 6 generates a reproduced RF signal from the light it has received. The RF signal changes in its level in accordance with the pits and lands formed in the optical disk 2. The reproduced RF signal is processed in the optical disk apparatus 1, thus reproducing the data recorded on the optical disk 2.

More specifically, an RF amplifier 7 amplifies the reproduced RF signal at a prescribed gain and effects waveform equalization on the reproduced RF signal. The signal output from the RF amplifier 7 is supplied to an EFM demodulation circuit 8. The EFM demodulation circuit 8 performs EFM (Eight-to-Fourteen Modulation) demodulation on the reproduced data in units of 14 channel bits, thereby reproducing 8-bit data items. The 8-bit data items, thus reproduced, are sequentially supplied to a random-access memory (RAM) 9.

The RAM 9 temporarily holds an 8-bit data reproduced. A CIRC (Cross Interleave Reed-Solomon Code) decoder 10 reads the reproduced data from the RAM 9 and corrects errors in the reproduced data, in accordance with the error correcting code added to the reproduced data. The data thus corrected is stored into the RAM 9. Audio data items are read in a predetermined order from the RAM 9 under the control of the system control circuit 5. That is, the audio data undergoes an interleave process. The audio data is supplied to an interpolation circuit 11.

The interpolation circuit 11 interpolates those parts of the audio data supplied from the RAM 9, which are difficult for the CIRC decoder 10 to correct. The audio data is supplied to a digital-to-analog converter 12 (hereinafter referred to as "D/A converter".) The D/A converter 12 converts the audio data supplied from the interpolation circuit 11, to an analog signal; it outputs an audio signal SA.

An interface (I/F) 14 is provided. This is an interface that has the function of authenticating apparatuses (hereinafter referred to as "external apparatuses") provided outside the optical disk apparatus and connected thereto. The interface 14 is, for example, an IEEE1394 interface. When an external apparatus is connected to the optical disk apparatus or when the power switch on the external apparatus is closed, the interface 14 authenticates this external apparatus. The interface 14 acquires the node number or the like that corresponds to the system configuration of the network including the external apparatus. In accordance with the node number or the like, the interface 14 will exchange various data with the external apparatus.

More specifically, to authenticate an external apparatus, the interface 14 supplies the authentication circuit 15 with the code (hereinafter referred to as "apparatus ID") obtained from the external apparatus and representing the type thereof. Thus, various types of apparatuses connected to the network, such as an amplifier, a hard disk drive, an optical disk apparatus, a modem, a personal computer and the like can be identified by their respective IDs.

The node number corresponding to the system configuration of the network may be designated, indicating that an external apparatus has made a request for data reproduction from the optical disk 2. In this case, the interface 14 supplies this request to the system control circuit 5 via the authentication circuit 15. The system control circuit 5 controls a switch 12, for example, turning the switch 12 on, thereby outputting the audio data to the external apparatus. Alternatively, the circuit 5 controls the switch 13, turning the same off, thereby stopping the supply of the audio data to the external apparatus.

That is, the authentication circuit 15 supplies the system control circuit 5 with the request the external apparatus has made. The circuit 15 then determines, from the apparatus ID already acquired, whether the external apparatus that has made the request can store data or not. The authentication circuit 15 supplies the result of the determination to the system control circuit 5. Apparatuses that can store data are, for example, a semiconductor memory, a hard disk drive, an optical disk drive, a personal computer, and the like.

A user may operate a control panel 16 to reproduce data from the optical disk 2. In this case, the authentication circuit 15 receives the request supplied from the system control circuit 5 and determines whether the external apparatus connected to the interface 14 can store data or not. The circuit 15 supplies the result of this determination to the system control circuit 5. If the authentication circuit 15 cannot acquire an apparatus ID from any external apparatus, it outputs a signal to the system control circuit 5, indicating that no external apparatuses can be identified at all.

The system control circuit 5 is, for example, a microprocessor. The circuit 5 controls the other components of the optical disk apparatus 1 in accordance of the operation on the control panel 16 or in response to requests made by the external apparatuses. If necessary, the system control circuit 5 causes a display section 17 to display various data items.

Figure 2:
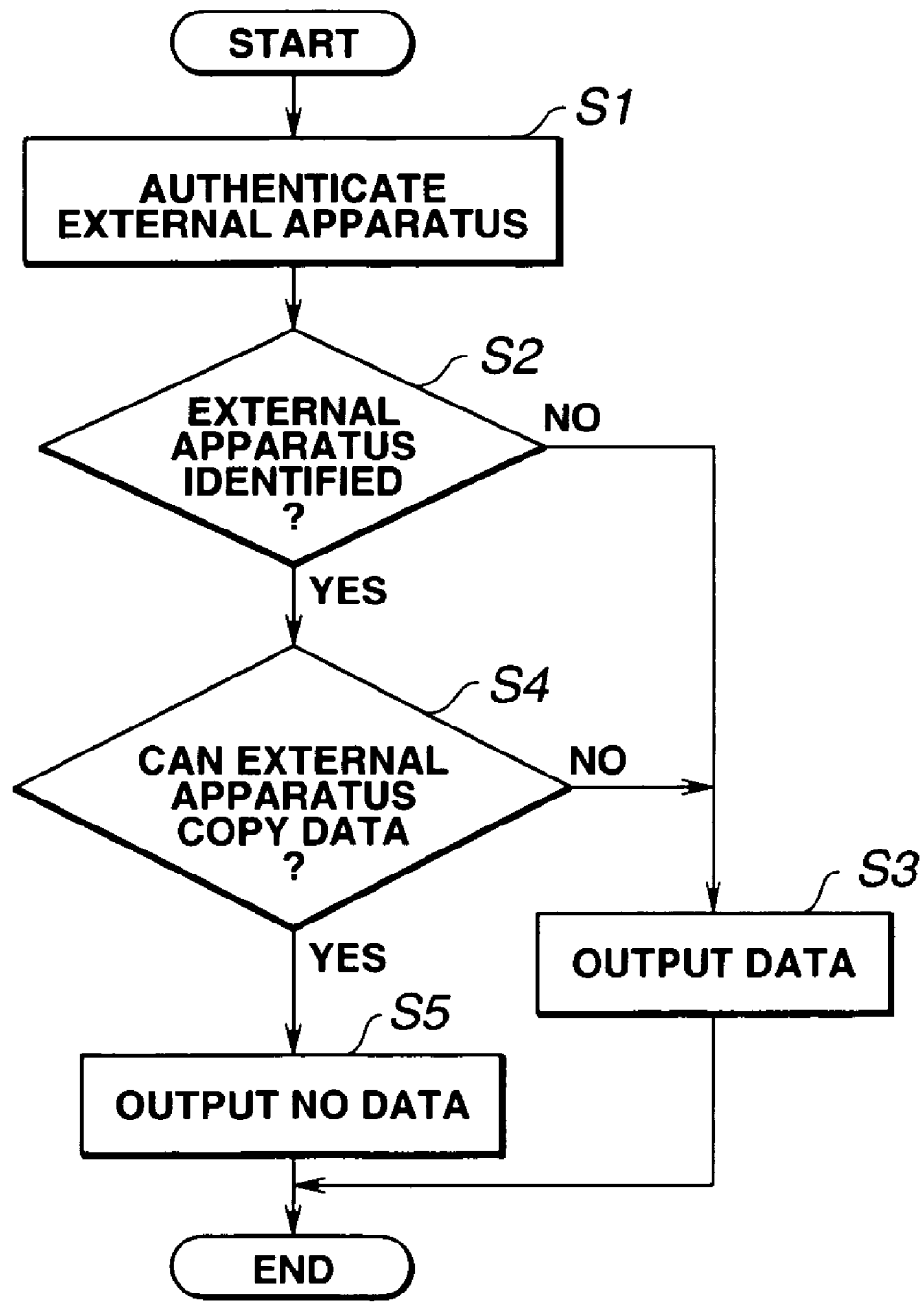
FIG. 2 is a flow chart for explaining the operation of the system control circuit incorporated in the optical disk apparatus illustrated in FIG. 1.

How the system control circuit 5 operates in response to the requests supplied from the external apparatuses or in accordance with the operation the user performs on the control panel 16 will be described, with reference to the flow chart shown in FIG. 2.

In Step S1, before the system control circuit 5 outputs the audio data, it acquires the result of determination supplied from the authentication circuit 15, which indicates whether the external apparatus can store data or not. The operation then goes to Step S2.

In Step S2, the system control circuit 5 determines whether the type of the external apparatus has been identified or not, from the result of determination supplied from the authentication circuit 15. If NO, the circuit 5 determines that the external apparatus is an old-fashioned one that cannot output an apparatus ID. Then operation goes to Step S3.

In Step S3, the system control circuit 5 controls various circuits to reproduce data from the optical disk 2 and output the audio data. Further, the circuit 5 controls the switch 13, turning on the same. Then, the circuit 5 terminates the process.

If YES in Step S2, the system control circuit 5 goes to Step S4. In Step S4, the circuit 5 determines whether the external apparatus is one that can store data or not. In other words, the circuit 5 determines whether or not the external apparatus has copying function. If the external apparatus has a copying function, the system control circuit 5 goes to Step S5. In Step S5, the circuit 5 maintains the switch 13 in off state and supplies a signal via the authentication circuit 15 and interface 14, indicating that the audio data will not be output to the external apparatus. The circuit 5 causes the display section 17 to display the message indicating that the audio data will not be output to the external apparatus. In short, the system control circuit 5 controls the other components to reproduce data from the optical disk 2 and outputs analog audio signal SA via the D/A converter 12, when the external apparatus has the function of copying data. In this case, however, the circuit 5 does not output the audio data (hereinafter referred to as "digital audio signal").

On the other hand, if the external apparatus has no copying function, the system control circuit 5 goes from Step S4 to Step S3. In Step S3, the circuit 5 controls the other components to reproduce data from the optical disk 1 and output analog audio data, as described above, and controls the switch 13, turning on the same. Thereafter, the circuit 5 terminates the process.

As can be clear from the above description, it is determined, in the optical disk apparatus 1 shown in FIG. 1, whether the external apparatus connected to the interface 14 can copy the digital audio signal or not, when the external apparatus supplies to the interface 14 a request for data reproduction from the optical disk 2 or when the user operates the control panel 16, thus generating a request for data reproduction from the optical disk 2.

If it is determined that the external apparatus is one incorporated in a data storage system and having data copying function, the digital audio signal is not transmitted to the external apparatus through the interface 14. In this condition, the data is reproduced again from the optical disk 2. This prevents illegal copying of the data at the external apparatus that has copying function.

If the external apparatus has no copying function like an amplifier, a speaker, a headphone or a digital-to-analog converter, or is an old-fashioned one that has no apparatus ID, the digital audio signal sequentially reproduced is output through the interface 14 to the external apparatus. The user can therefore enjoy listening to high-quality music or the like.

In other words, in the optical disk apparatus 1, the data communication via the interface 14 serves to determine whether the external apparatus connected to the interface 14 is one that can store data. If it is determined that the external apparatus is one that can store data, the transmission of audio data to the external apparatus via the interface 14 is prohibited. Hence, illegal copying at the external apparatus is effectively prevented.

Figure 3:
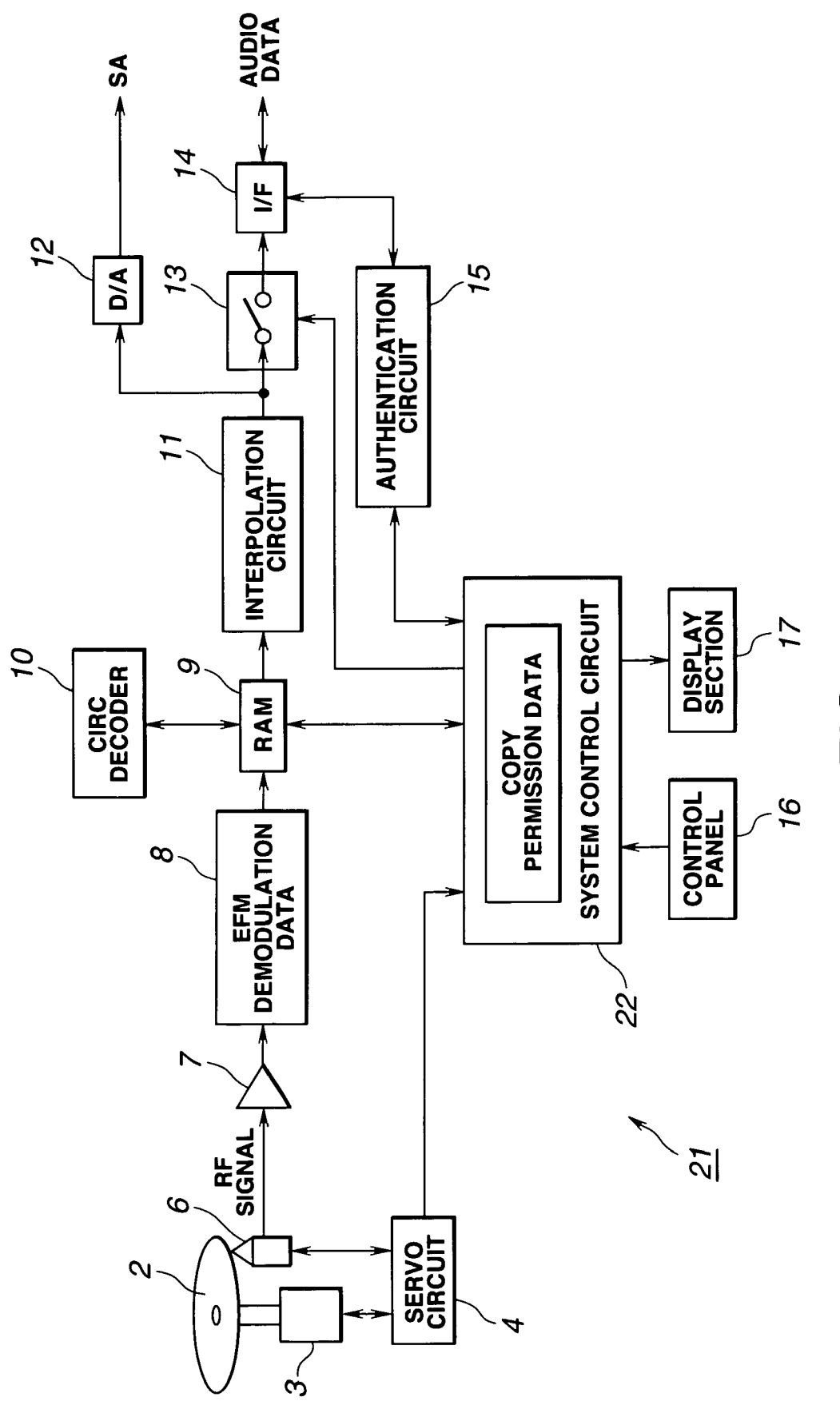
FIG. 3 is a block diagram depicting the actual structure of an optical disk apparatus to which this invention is applied.

FIG. 3 is a block diagram depicting the actual structure of an optical disk apparatus 21 according to this invention is applied, in which the transmission of audio data is controlled in accordance with the copy permission data that is recorded in an optical disk 2. In FIG. 3, the components identical to those of the optical disk apparatus 1 illustrated in FIG. 1 are designated as the same reference numerals. These components of the optical disk apparatus 21 will not be described in detail.

In the optical disk apparatus 21, a system control circuit 22 controls the other circuits of the apparatus 21 to access the read-in area of an optical disk 2, when the optical disk 2 is set in the apparatus 21 or when the power switch to the apparatus 21 is closed. The copy permission data is read from the read-in area to permit the copying data recorded on the optical disk 2.

The copy permission data is, for example, a 2-bit code as is illustrated in FIG. 4. It is information for permitting copying of the music source recorded on the optical disk 2. More precisely, the 2-bit code have the value of "00" to inhibit copying of data, no matter whether the data is a digital signal or an analog signal. The code have the value of "01" to permit the first-generation copying of an analog signal. The code have the value of "10" to permit the first-generation copying of either a digital signal or an analog signal. The code have the value of "11" to permit whichever generation copying of whichever type of a signal.

In the optical disk apparatus 21, the system control circuit 22 controls the transmission of digital audio signals through the interface 14, in accordance with the result of the determination to the system control circuit 5.

When the copy permission data has the value of "11" or "10", for example, the system control circuit 22 controls other circuits to output an analog audio signal and a digital audio signal, no matter whether which type the external apparatus is.

When the copy permission data has the value of "01" or "00", the system control circuit 22 controls other circuits to stop outputting a digital audio signal, only if the external apparatus is one that can copy data.

To output a digital audio signal, the system control circuit 22 adds the copy permission data to the digital audio signal. To output an analog audio signal, the system control circuit 22 adds to the audio analog signal the copy permission data in the form of a so-called water mark, at a position that is close to, for example, that part of the signal which has a prominent spectrum. Copyrighted data can thereby be protected by means of copy management systems such as SCMS (Serial Copy Management System) and the like.

That is, in the optical disk apparatus shown in FIG. 3, the transmission of audio data is controlled not only in accordance with the result of determination performed by the authentication circuit 15, but also in accordance with the copy permission data. Illegal copying of the copyrighted data is thereby prevented, thus protecting the copyright holder.

Figure 5:
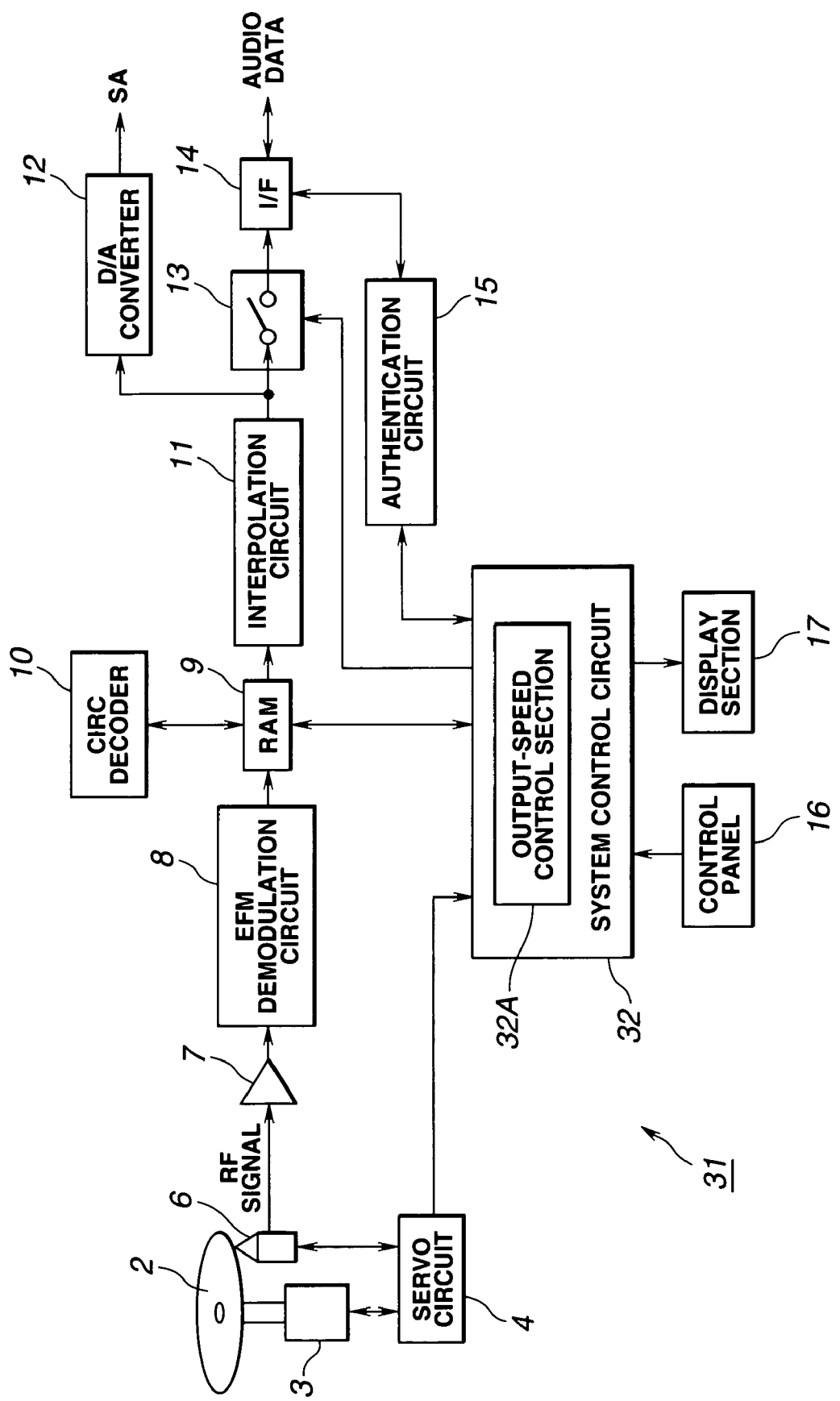
FIG. 5 is a block diagram illustrating the actual structure of an optical disk apparatus to which the invention is applied.

FIG. 5 is a block diagram illustrating the actual structure of an optical disk apparatus according to the invention, in which the transmission of a digital audio signal to an external apparatus is controlled in accordance with the speed at which to transmit the digital audio signal to the external apparatus. In FIG. 4, the components identical to those of the optical disk apparatus 1 illustrated in FIG. 1 are designated as the same reference numerals. These components of this optical disk apparatus 31 will not be described in detail.

In the optical disk apparatus 31, a system control circuit 32 incorporates an output-speed control section 32A. The output-speed control section 32A switches the rotation speed of an optical disk 2 when the user operates a control panel 16 or when an external apparatus makes a request for data reproduction. That is, the system control circuit 32 controls the data reproduction at a standard speed or at a speed higher than the standard speed.

The digital audio signal is a digital signal generated by sampling an analog audio signal at a prescribed sampling frequency. The digital audio signal may be reproduced from the optical disk 2 at the standard reproducing speed that corresponds to the sampling frequency. Alternatively, the digital audio signal may be reproduced from the optical disk 2 at a higher reproducing speed, while the optical disk 2 is being rotated at a speed higher than the standard speed that corresponds to the sampling speed. For example, the digital audio signal can be reproduced at 1.5 times the standard speed, 2 times the standard speed, 4 times the standard speed, 8 times the standard speed, 16 times the standard speed, or the like.

The system control circuit 32 controls the transmission of the digital audio signal in accordance with not only the result of determination performed by the authentication circuit 15, but also the data transmission speed corresponding to the speed at which the digital audio signal has been reproduced. The signal may be reproduced at a speed higher than the standard speed, more likely for copying the audio data than for reproducing the same. If the audio data is copied, it may be illegal copying for all probability.

How the system control circuit 32 operates will be explained, with reference to the flow chart shown in FIG. 6.

In Step S11, the system control circuit 32 determines whether or not the digital audio signal has been reproduced at a speed higher than the standard one. If the signal has been reproduced at a higher speed, the circuit 32 goes to Step S16. In Step S16, the circuit 32 controls the switch 13, turning off the same. The transmission of the digital audio signal is thereby stopped. If the signal has been reproduced at the standard speed, the system control circuit 32 goes to Step S12 and performs processes similar to Steps S1 to S4 shown in FIG. 2. That is, the system control circuit 32 acquires the result of determination that the authentication circuit 15 has carried out with regard to the external apparatus. In Step S13, the circuit 32 determines whether the external apparatus has been identified or not. In Step S14, the circuit 32 outputs the digital audio signal. In Step S15, the circuit 32 determines whether or not the external apparatus is one which is incorporated in a data storage system and which has a copying function. Hence, the system control circuit 32 controls the other circuits to transmit the digital audio signal if the digital audio signal has been reproduced at the standard speed and if the external apparatus is an old-fashioned one that has no apparatus ID or an apparatus that cannot store and hold data. In any other cases, the circuit 32 controls the other circuits to stop the transmission of the digital audio signal to the external apparatus.

In other words, the transmission of the digital audio signal is controlled in accordance with the speed of transmitting the data, as well as the result of the determination effected by the authentication circuit 15. Therefore, the optical disk apparatus 31 shown in FIG. 5 can prevent illegal copying more reliably in the optical disk apparatus 32 shown in FIG. 5.

Figure 6:
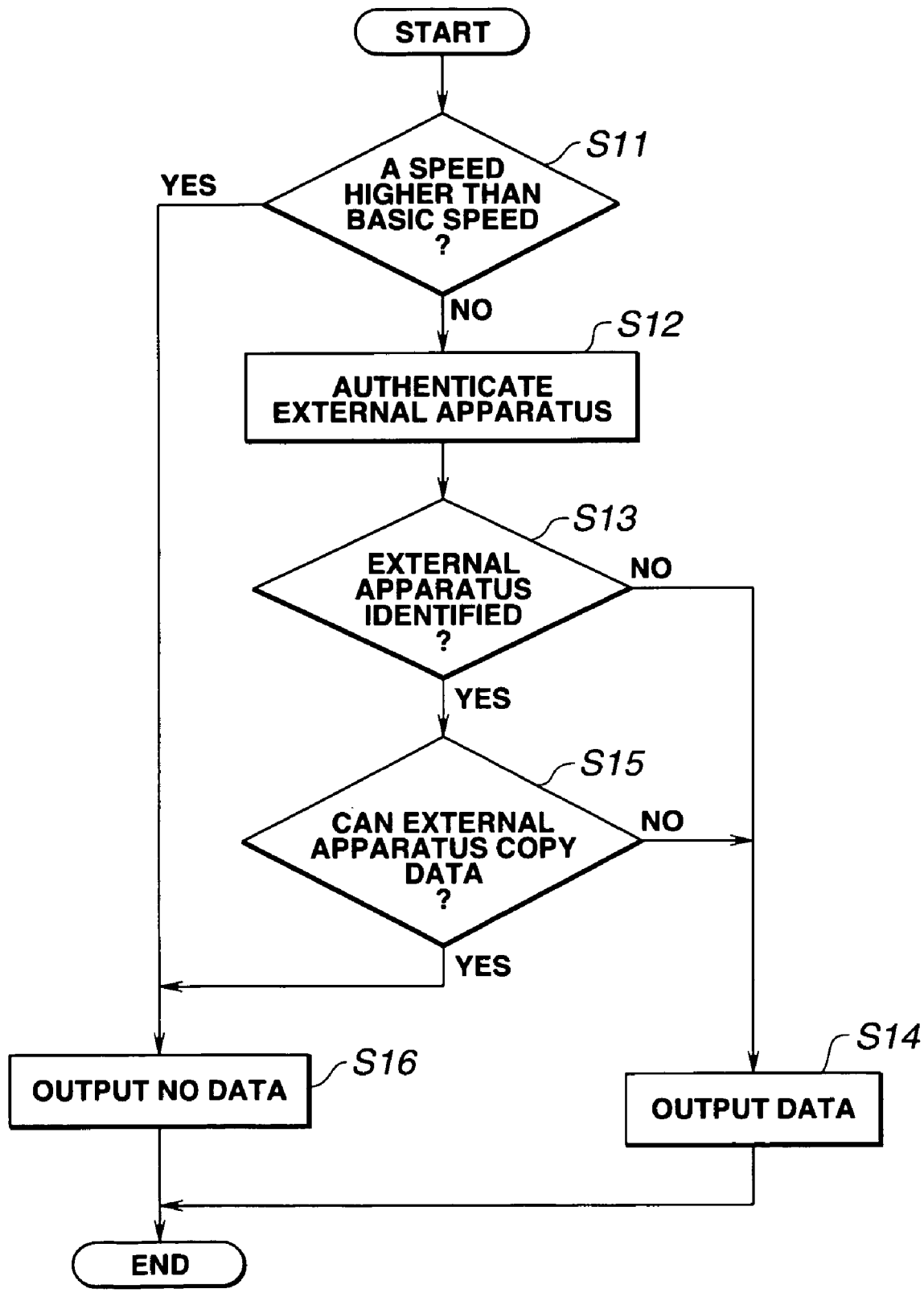
FIG. 6 is a flow chart for explaining the operation of the system control circuit incorporated in the optical disk apparatus illustrated in FIG. 5.
Figure 7:
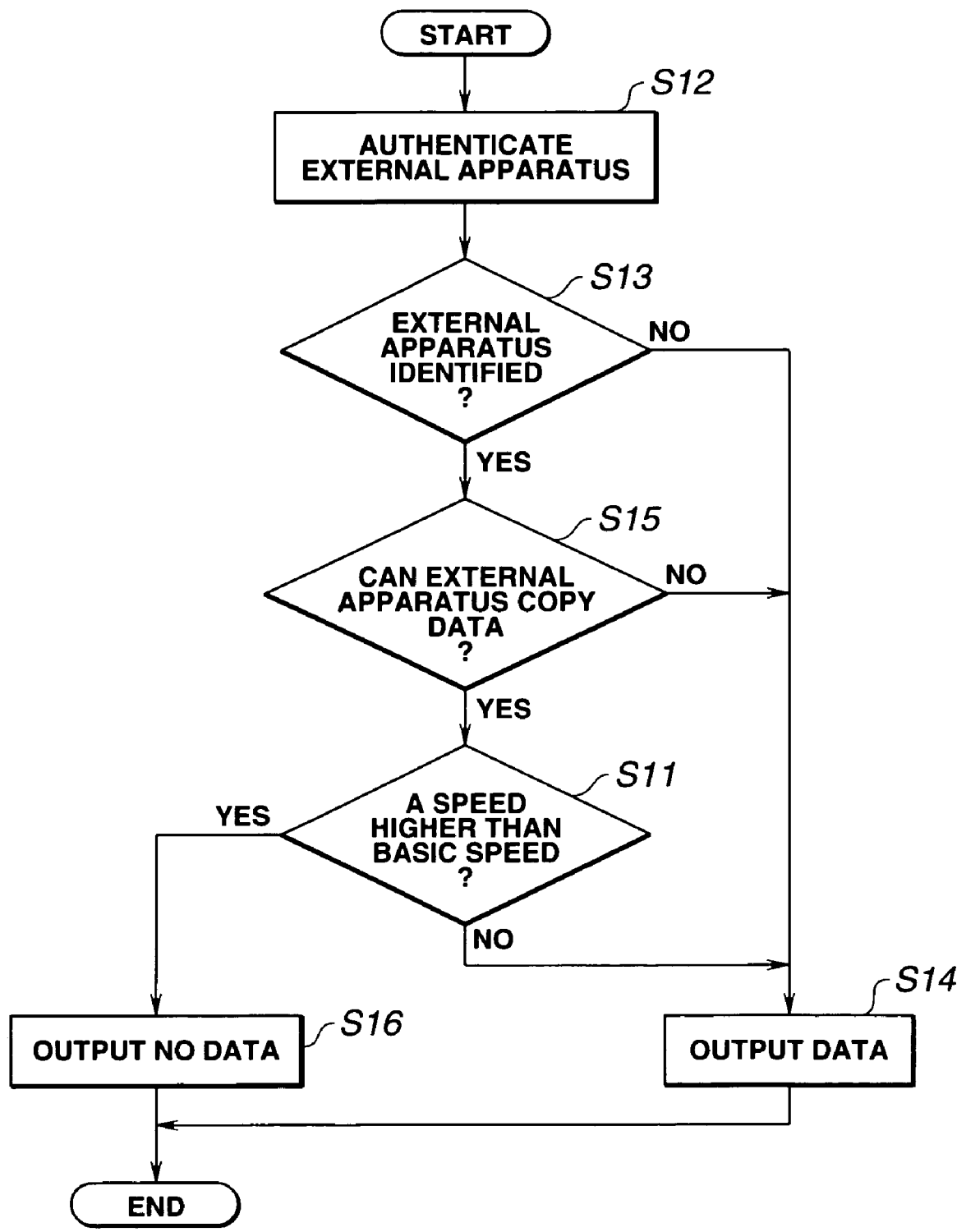
FIG. 7 is another flow chart for explaining the operation of the system control circuit incorporated in the optical disk apparatus illustrated in FIG. 5.

The order in which the steps shown in the flow chart of FIG. 6 is not limited to the one illustrated in FIG. 6. Rather, Step S11 of determining whether the digital audio signal has been reproduced at a higher speed may be carried out at last. In this case, the transmission of the digital audio signal is stopped if it is determined in Step S11 that the signal has been reproduced at the higher speed. Thus, in the case where the external apparatus is one that can copy data, the copying of data, which is probably illegal, can be reliably prevented by stopping the transmission of the digital audio signal reproduced at a speed higher than the standard reproducing speed.

The speed of reproducing the digital audio signal, i.e., a condition of transmitting the digital audio signal, may be added to the copy permission data recorded on the optical disk 2.

For example, the copy permission data recorded on the optical disk 2 may be a 3-bit code as is illustrated in FIG. 8. More precisely, the 3-bit code has the value of "000" to inhibit copying of data. The code has the value of "001" to permit the uni-copying of data at the standard reproducing speed only. "Uni-copying" means copying of a digital audio signal reproduced by the optical disk apparatus 31, thus providing a single copy, not simultaneous or parallel copying of a digital audio signal by means of a plurality of apparatuses.

The code have the value of "010" to permit the uni-copying at either the standard reproducing speed or a higher reproducing speed. The code has the value of "011" to permit only uni-copying at a higher speed or only the first-generation copying at the standard reproducing speed. The code has the value of "100" to permit only the first-generation copying at either the standard reproducing speed or a higher reproducing speed. The code has the value of "111" to permit whichever generation copying of whichever type of a signal, digital or analog, at whichever speed, standard speed or a higher speed.

When the copy permission data has the value of "111" or "100", the system control circuit 32 controls the other circuits to output an analog audio signal and a digital audio signal, regardless of the reproducing speed and the type of the external apparatus.

When the copy permission data has the value of "011", the system control circuit 32 controls the other circuits to output an analog audio signal and a digital audio signal, regardless of the type of the external apparatus, if the data has been reproduced at the standard speed. To reproduce a signal at a speed higher than the standard speed, a plurality of external apparatuses are designated in accordance with the result of determination, as ones to which the digital audio signal will be transmitted. In this case, the system control circuit 32 controls the other circuits to stop the outputting of the digital audio signal, provided that at least two of the apparatuses designated can copy data.

When the copy permission data has the value of "010", a plurality of external apparatuses are designated as ones to which the digital audio signal will be transmitted, regardless of the reproducing speed. If so, the system control circuit 32 controls the other circuits to stop the outputting of the digital audio signal, provided that at least two of the apparatuses designated can copy data.

When the copy permission data has the value of "001", a plurality of external apparatuses are designated in accordance with the result of determination, as ones to which the digital audio signal will be transmitted, if the signal has been reproduced at a speed higher than the standard speed. In this case, the system control circuit 32 controls the other circuits to stop the outputting of the digital audio signal. If the signal has been reproduced at the standard speed, the circuit 32 controls the other circuits to stop the outputting of the digital audio signal, provided that at least two of the apparatuses designated can copy data.

When the copy permission data has the value of "000", an external apparatus is designated, regardless of the reproducing speed, in accordance with the result of the determination, as one to which the digital audio signal will be transmitted. In this case, the system control circuit 32 controls the other circuits to stop the outputting of the digital audio signal.

To output a digital audio signal, the system control circuit 32 adds the copy permission data to the digital audio signal. To output an analog audio signal, the system control circuit 32 adds to the audio analog signal the copy permission data in the form of a so-called water mark, at a position that is close to, for example, that part of the signal which has a prominent spectrum.

By using the copy permission data shown in FIG. 8, the transmission of audio data can be controlled not only in accordance with the result of the determination performed by the authentication circuit 15, but also in accordance with the speed of transmitting the digital audio signal. This can prevent illegal copying of the copyrighted data more reliably.

Figure 9:
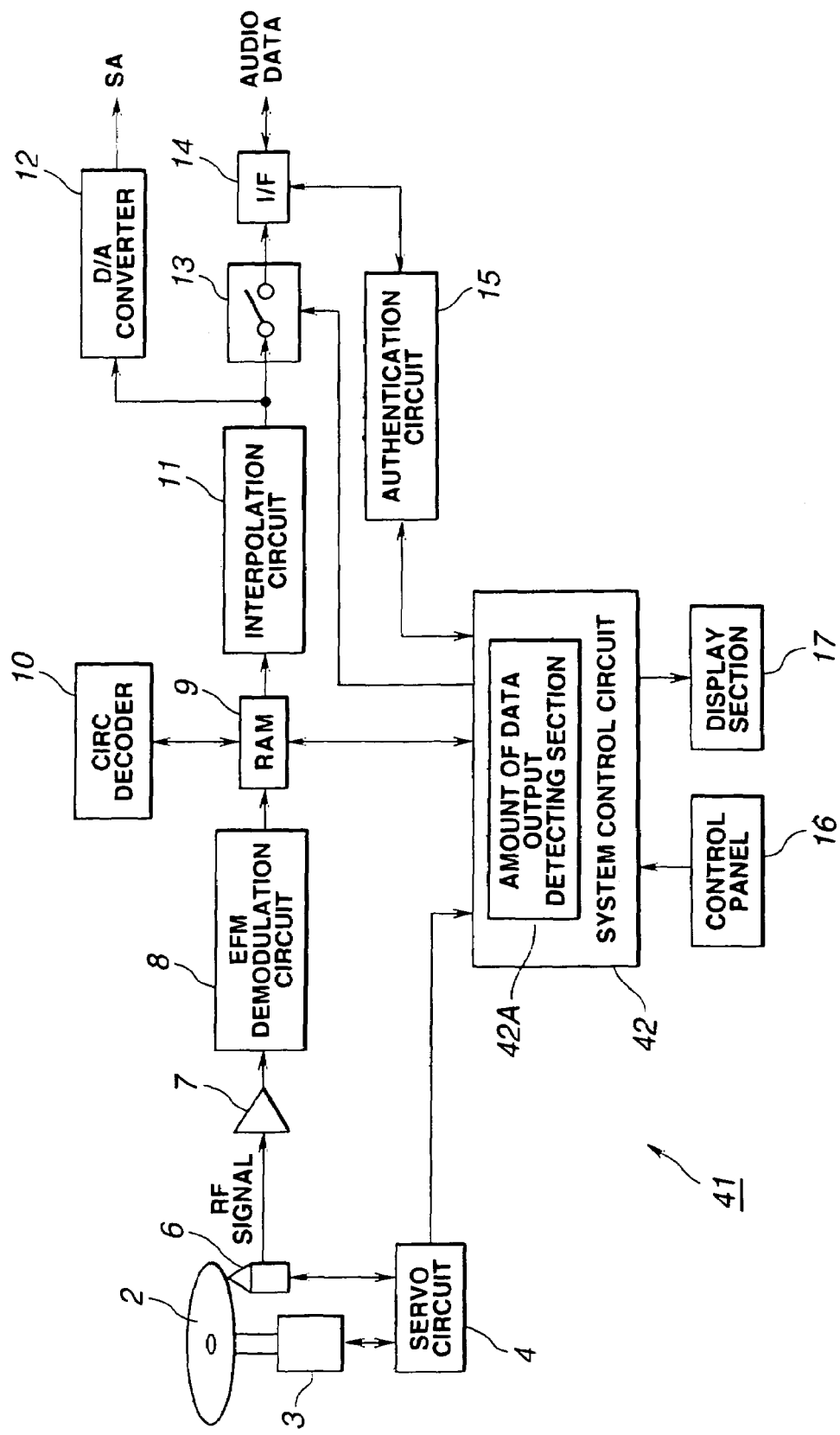
FIG. 9 is a block diagram showing the actual structure of an optical disk apparatus to which the present invention is applied.

FIG. 9 is a block diagram showing the actual structure of an optical disk apparatus according to the present invention, in which the transmission of a digital audio signal to an external apparatus is controlled in accordance with the amount of the digital audio signal to be transmitted to the external apparatus. In FIG. 9, the components identical to those of the optical disk apparatus 1 illustrated in FIG. 1 are designated at the same reference numerals. These components of this optical disk apparatus 41 will not be described in detail.

In the optical disk apparatus 41, a system control circuit 42 incorporates an output-data amount detecting section 42A. When a user operates a control panel 16 or when an external apparatus makes a request for data reproduction, the output-data amount detecting section 42A detects the amount of the digital audio signal which has been reproduced from an optical disk 2 and which will be transmitted to the external apparatus. The user may repeatedly copy data in units of musical pieces in some cases. Therefore, the system control circuit 42 detects the amount of data to be transmitted, in accordance with the accumulated amount of the digital audio signals reproduced from the optical disk 2.

The user may copy the digital audio signals recorded on the optical disk 2 in units of musical pieces, probably because he or she wants to enjoy the musical pieces he or she likes. If the user copies the entire optical disk 2, this may be because he or she is attempting to distribute the copy to other persons. If the user copies one musical piece which lasts, for example, 4 minutes, 36 MB of data will be transmitted. If the user copies the whole optical disk 2 and if the disk 2 is a 60-minute playing one, 540 MB of data will be transmitted. Hence, the system control circuit 42 controls the other circuits to stop the transmission of the digital audio signal if the external apparatus has a copying function and if the amount of data to be transmitted thereto is, for example, 36 MB or more.

In other words, the optical disk apparatus 41 shown in FIG. 9 can prevent illegal copying with higher reliability, by controlling the transmission of a digital audio signal in accordance with not only the result of determination performed by the authentication circuit 15, but also the amount of the digital audio signal which will be transmitted to the external apparatus. Illegal copying of the copyrighted data is thereby prevented more reliably.

The present invention is not limited to the embodiments described above. For instance, the external apparatus may not be authenticated and the transmission of the digital audio signal may be controlled before the signal is transmitted to the external apparatus through the interface 14. The user may forge an apparatus ID since the user can set the various data-transmitting conditions with his or her personal computer. Once the user has forged the apparatus ID, the authentication of the external apparatus is no longer effective. Hence, the transmission of the digital audio signal is controlled, without performing the process of authenticating the external apparatus, in the case where the interface 14 is one, e.g., an IEEE1394 bus, an USB (Universal Serial Bus) or the like, to which personal computers can be connected. As a result, illegal copying can be effectively prevented even if the user has forged an apparatus ID.

In addition to the result of determination performed by the authentication circuit 15, the copy permission data, the data-transmitting speed and the amount of data being transmitted may be applied to control the transmission of a digital audio signal to the external apparatus. Basically, the transmission of the digital audio signal to the external apparatus is controlled according to the copy permission data. If the user appears to be copying the data to distribute the data to other persons, the transmission of the digital audio signal is stopped in accordance with the data-transmitting speed and the amount of data being transmitted. In other words, the transmission of audio data to the external apparatus via the interface 14 is controlled in accordance not only with the result of determination performed by the authentication circuit 15, but also with the copy permission data, the data-transmitting speed and the amount of data being transmitted, Illegal copying can thereby be prevented with higher reliability. In this case, these control conditions can be applied in any possible priority order.

Figure 10:
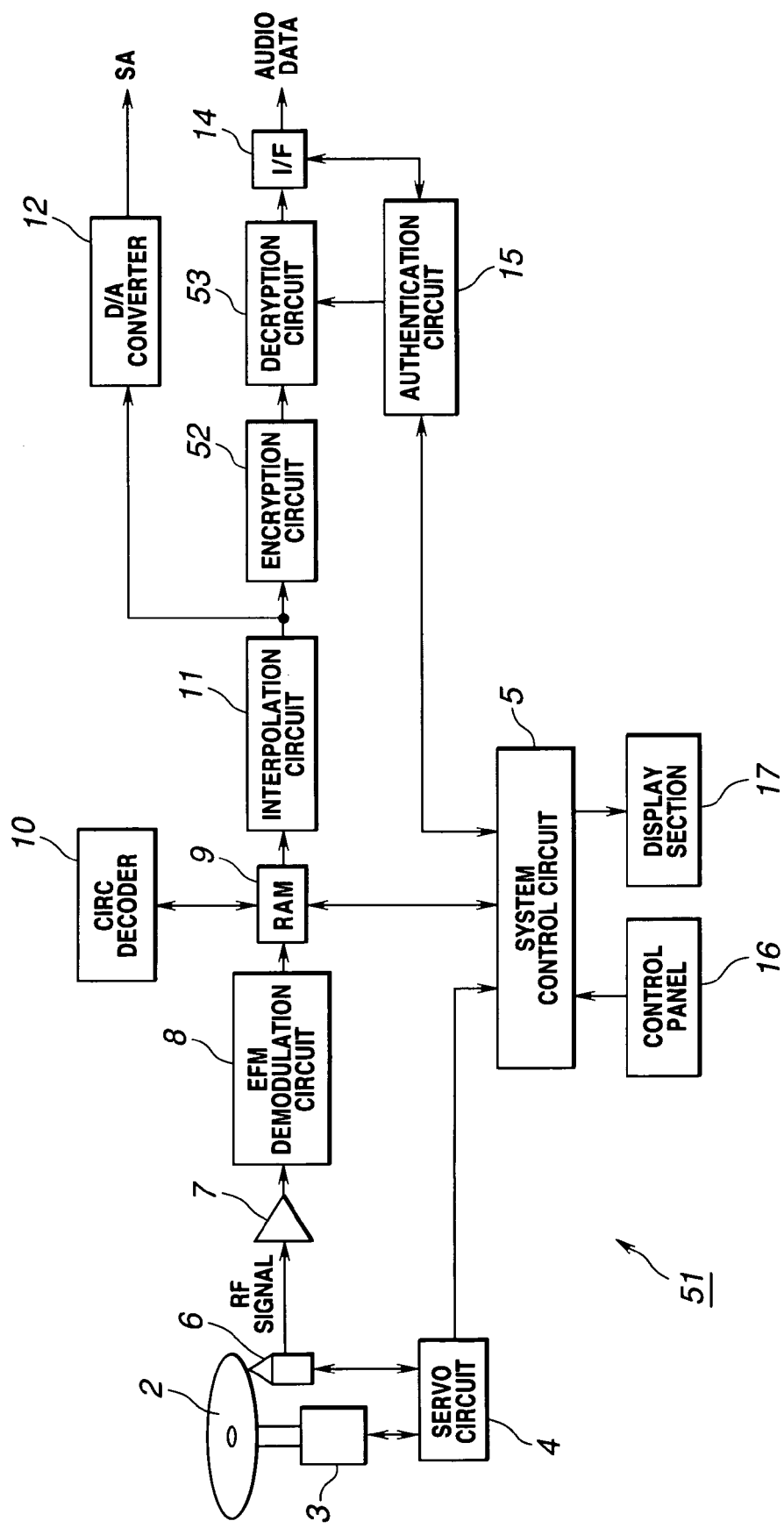
FIG. 10 is a block diagram illustrating the actual structure of an optical disk apparatus to which the present invention is applied.

FIG. 10 is a block diagram illustrating the actual structure of an optical disk apparatus according to the invention, in which a digital audio signal is encrypted before it is transmitted. As shown in FIG. 10, the optical disk apparatus 51 has an encryption circuit 52 and a decryption circuit 53, which are used in place of the switch 13 incorporated in the optical disk apparatus 1 of FIG. 1. These circuits 52 and 53 are provided between the interpolation circuit 11 and the interface 12. The components identical to those of the optical disk apparatus 1 shown in FIG. 1 are designated at the same reference numerals. These components of this optical disk apparatus 51 will not be described in detail.

The encryption circuit 52 encrypts the digital audio signal output from the interpolation circuit 11. The signal encrypted is supplied to the decryption circuit 53. The decryption circuit 53 decrypts the encrypted digital audio signal if the system control circuit 5 has turned on the switch 13 shown in FIG. 1. The signal, thus decrypted, is output to the interface 14. If the system control circuit 5 has turned off the switch 13 and if the transmission of the digital audio signal is inhibited, the digital audio signal encrypted by the encryption circuit 52 passes through the decryption circuit 53 and is output to the interface 14.

In the optical disk apparatus 51 shown in FIG. 10, the transmission of a digital audio signal is controlled by transmitting the signal in either encrypted state or unencrypted state, not by using the switch 13 as in the other embodiments described above. In other words, the optical disk apparatus 51 transmits either an encrypted digital audio signal or an unencrypted digital audio signal to the external apparatus. Even if the user copies the encrypted digital signal at the external apparatus, he or she cannot listen to the music that corresponds to the digital audio signal. Thus, illegal copying can be prevented.

Figure 11:
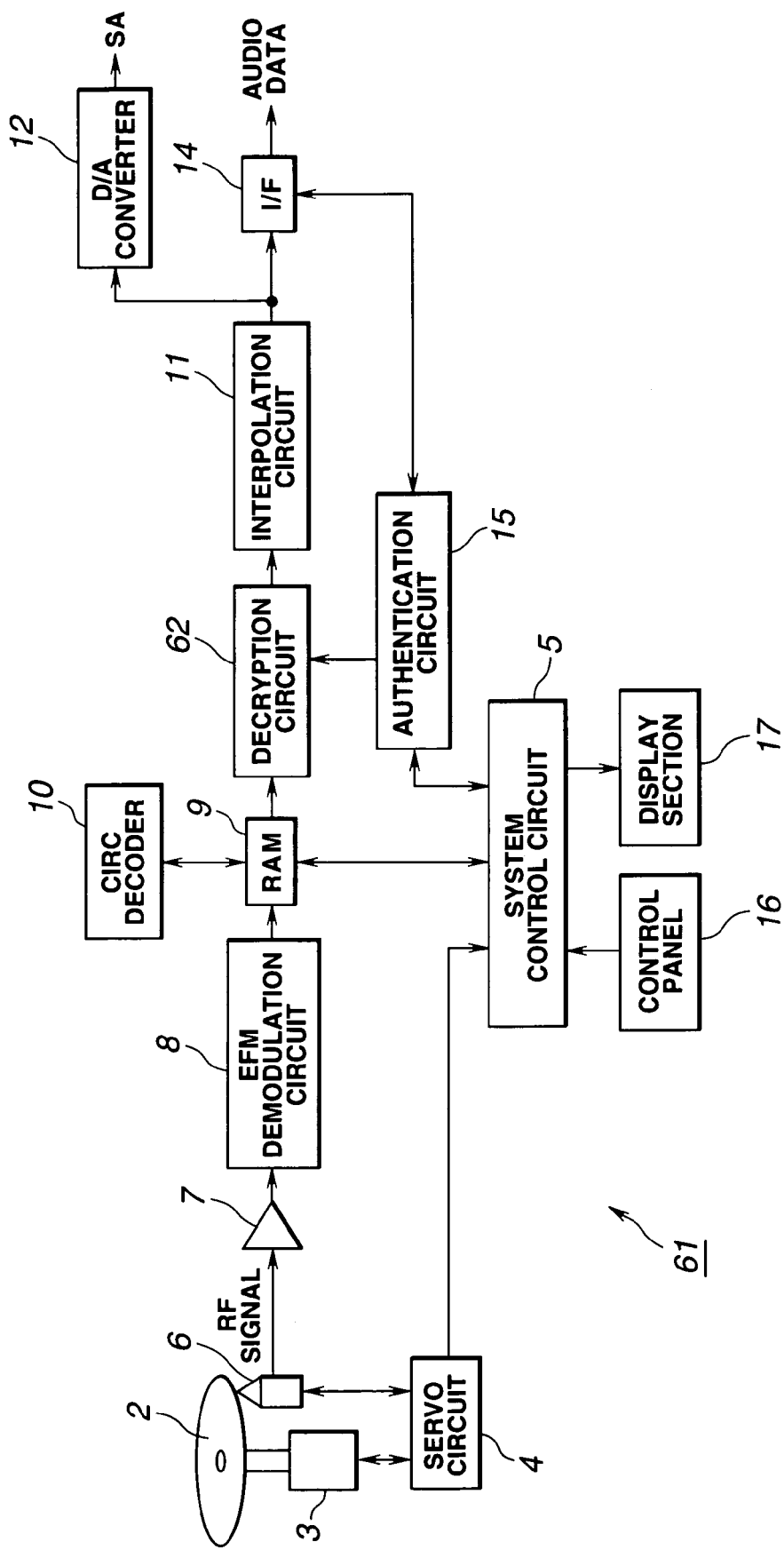
FIG. 11 is also a block diagram depicting the actual structure of an optical disk apparatus to which the invention is applied.

FIG. 11 is also a block diagram depicting the actual structure of an optical disk apparatus according to the invention, which reproduce an encrypted digital audio signal recorded in an optical disk 2. As shown in FIG. 11, the optical disk apparatus 61 comprises a decryption circuit 62, which is provided in place of the switch 13 used in the optical disk apparatus 1 shown in FIG. 1. The decryption circuit 62 is provided between the RAM 9 and the interpolation circuit 11. The components identical to those of the optical disk apparatus 1 shown in FIG. 1 are designated as the same reference numerals. These components of the optical disk apparatus 61 will not be described in detail.

Under the control of the system control circuit 5, the decryption circuit 62 decrypts the encrypted digital audio signal supplied from the RAM 9, while the switch 13 shown in FIG. 1 remains on. The signal decrypted is supplied to the interpolation circuit 11. If the switch 13 is turned off, stopping the transmission of the digital audio signal, the decryption circuit 62 outputs the encrypted digital audio signal supplied from the RAM 9, to the interpolation circuit 11.

That is, the optical disk apparatus 61 shown in FIG. 11 controls the transmission of a digital audio signal by transmitting either an encrypted digital audio signal or an unencrypted digital audio signal, not by operating the switch 13 as in the optical disk apparatus 51 shown in FIG. 10. In other words, the encrypted digital audio signal recorded on the optical disk 2 or a digital audio signal not encrypted is selected and transmitted in the optical disk apparatus 61. The apparatus 61 can therefore effectively prevent illegal copying as can the optical disk apparatus 51 shown in FIG. 10.

Figure 12:
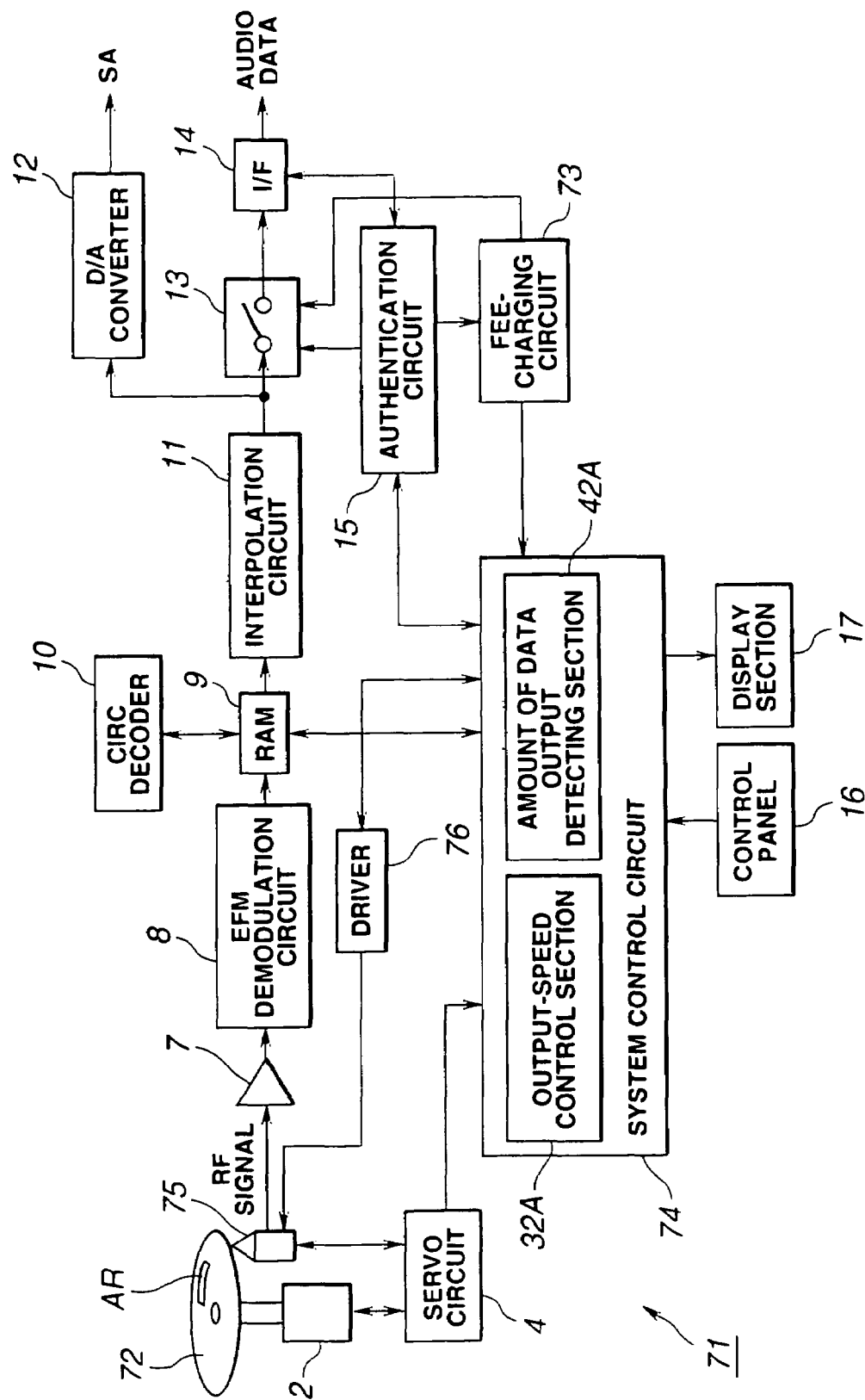
FIG. 12 is a block diagram showing the actual structure of an optical disk apparatus to which the invention is applied.

FIG. 12 is a block diagram showing the actual structure of an optical disk apparatus according to this invention. In FIG. 12, the components identical to those of the optical disk apparatus 1 illustrated in FIG. 1 are designated at the same reference numerals. These components of the optical disk apparatus 71 will not be described in detail.

The optical disk apparatus 71 incorporates an optical disk 72. The disk 72 is, for example, a so-called CD-R, which has a recording area AR at the circumferential part. The area AR has a size large enough to record the sum of fees to be charged.

In the optical disk apparatus 71, the optical pickup 75 is similar in structure to the optical pickup 6 shown in FIG. 1. Controlled by a driver 76, the optical pickup 75 intermittently intensifies the laser beam applied to the disk 72. Pits are thereby formed sequentially in the recording area AR of the optical disk 72.

Figure 13:
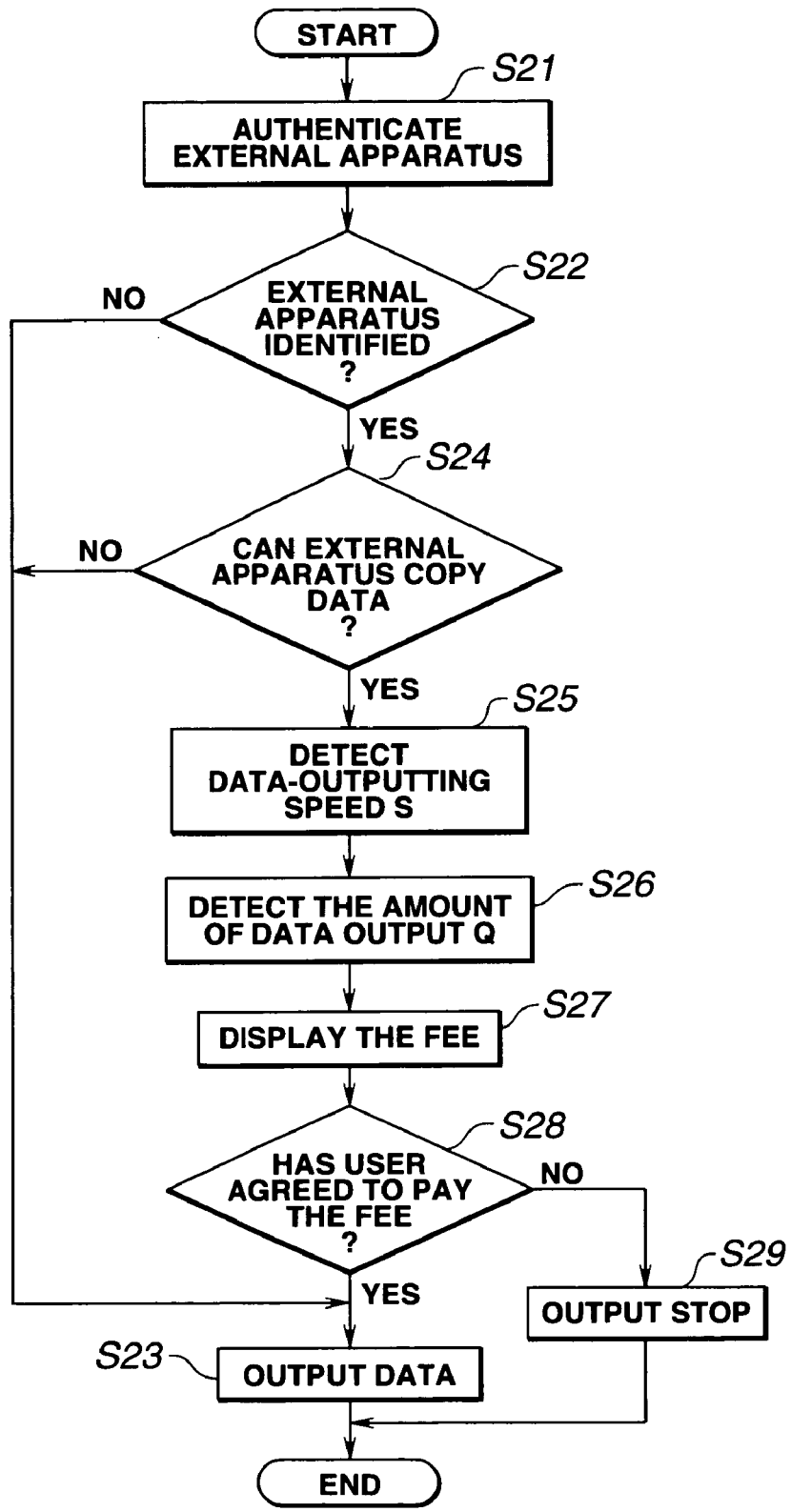
FIG. 13 is a flow chart for explaining the operation of the system control circuit incorporated in the optical disk apparatus shown in FIG. 12.

A fee-charging circuit 73 is provided, which calculates fees under the control of a system control circuit 74. The data representing the fees is supplied to the system control circuit 74. The system control circuit 74 performs a fee-charging process as is shown in the flow chart of FIG. 13.

First, in Step S21, the system control circuit 74 acquires the result of determination performed regarding an external apparatus from an authentication circuit 15 when the external apparatus makes a request for data reproduction or when the user operates a control panel 16. The system control circuit 74 goes to Step S22.

In Step S22, the system control circuit 74 determines whether the type of the external apparatus has been identified or not, from the result of determination supplied from the authentication circuit 15. If NO, the circuit 74 determines that the external apparatus is an old-fashioned one that cannot output an apparatus ID. Then operation goes to Step S23.

In Step S23, the system control circuit 5 controls the other components to reproduce data from the optical disk 72 and output analog audio data, and controls a switch 13, turning on the same. Then, the circuit 74 terminates the process.

If YES in Step S22, the system control circuit 5 goes to Step S24. In Step S24, the circuit 5 determines whether the external apparatus is one that can store data or not. In other words, the circuit 74 determines whether or not the external apparatus has a copying function. If the external apparatus has no copying function, the system control circuit 74 goes to Step S23. In Step S23, the system control circuit 74 controls the other components to reproduce data from the optical disk 72 and output analog audio data, as described above, and controls a switch 13, turning on the same. Thereafter, the circuit 74 terminates the process.

If the external apparatus has a copying function, the system control circuit 74 goes from Step S24 to Step S25. The system control circuit 74 incorporates an output-speed control section 32A, which detects the data-reproducing speed S. Thereafter, the circuit 74 goes to Step S26. In Step S26, the output-data amount detecting section 42A incorporated in the circuit 74 detects the amount Q of the digital audio signal reproduced. The amount Q of data does not pertain to digital audio signals accumulated, but to the amount of a digital audio signal that has been reproduced as a series of processes is carried out.

In Step S27, the system control circuit 74 supplies the data representing the data-reproducing speed S and the amount Q of data, to the fee-charging circuit 73. The fee-charging circuit 73 calculates a fee B from the data-reproducing speed S and the amount Q of data, in accordance with the following equation. The data representing the fee B is supplied to the system control circuit 74. The system control circuit 74 causes a display section 17 to display the fee B. The circuit 74 then goes to Step S28.

$$B = b \times Q \times (0.9 + S/(10 \times S0))$$

In the equation, b is unit fee, e.g., 2 yen/Mbit, and S0 is the standard data-reproducing speed. In the optical disk apparatus 71, the fee-charging circuit 73 calculates a fee that increases in proportion to the amount Q of the digital audio signal to be transmitted and the data-reproducing speed S.

In Step S28, the system control circuit 74 determines whether or not the user has agreed to pay the fee, from the operation the user effects on control panel 16 or the message transmitted from the external apparatus. If YES, the system control circuit 74 makes the optical pickup 75 seek the recording area AR of the optical disk 72. The circuit 74 then determines whether or not the area AR includes a vacant region that corresponds to the fee B. If the area AR includes such a region corresponding to the fee B, the system control circuit 74 records prescribed data in the area AR, reducing the vacant regions in the area AR in proportion to the fee B. Then, the system control circuit 74 goes to Step S23. In Step S23, the circuit 74 controls the other circuits to start reproducing the digital audio signal and transmit the digital audio signal to the external apparatus.

If it is determined in Step S28 that the user has not agreed to pay the fee or that the area AR includes no regions corresponding to the fee B, the system control circuit 74 goes to Step S29. In Step S29, the system control circuit 74 controls the other circuits to output an analog audio signal. Further, the circuit 74 controls the switch 13, turning off the same. The transmission of the digital audio signal is thereby stopped. The circuit 74 then terminates the process.

In the optical disk apparatus 71, the type of the external apparatus connected to the interface 14 is determined, and the fee-charging process is controlled on the basis of the result of determining the type of the external apparatus. Thus, the fee for the use of the digital audio signal can be charged, whether the user uses the signal for private use or for any other purpose. It is therefore possible to prevent illegal copying.

The fee may be changed in accordance with the speed at which the digital audio signal is transmitted. In this case, the fee can be more minutely set at a reasonable value.

In the optical disk apparatus 71, the vacant region in the recording area AR on the optical disk 72 is reduced in proportion to the fee B. Instead, the data representing the sum of fees for the digital audio signals transmitted may be recorded in the read-in area of the optical disk 72. In this case, it suffices to update the data representing the sum in accordance with the amount of the digital audio signal transmitted, and to stop the transmission of the digital audio signal when the sum represented by the data updated increases to or exceeds a prescribed value.

Figure 14:
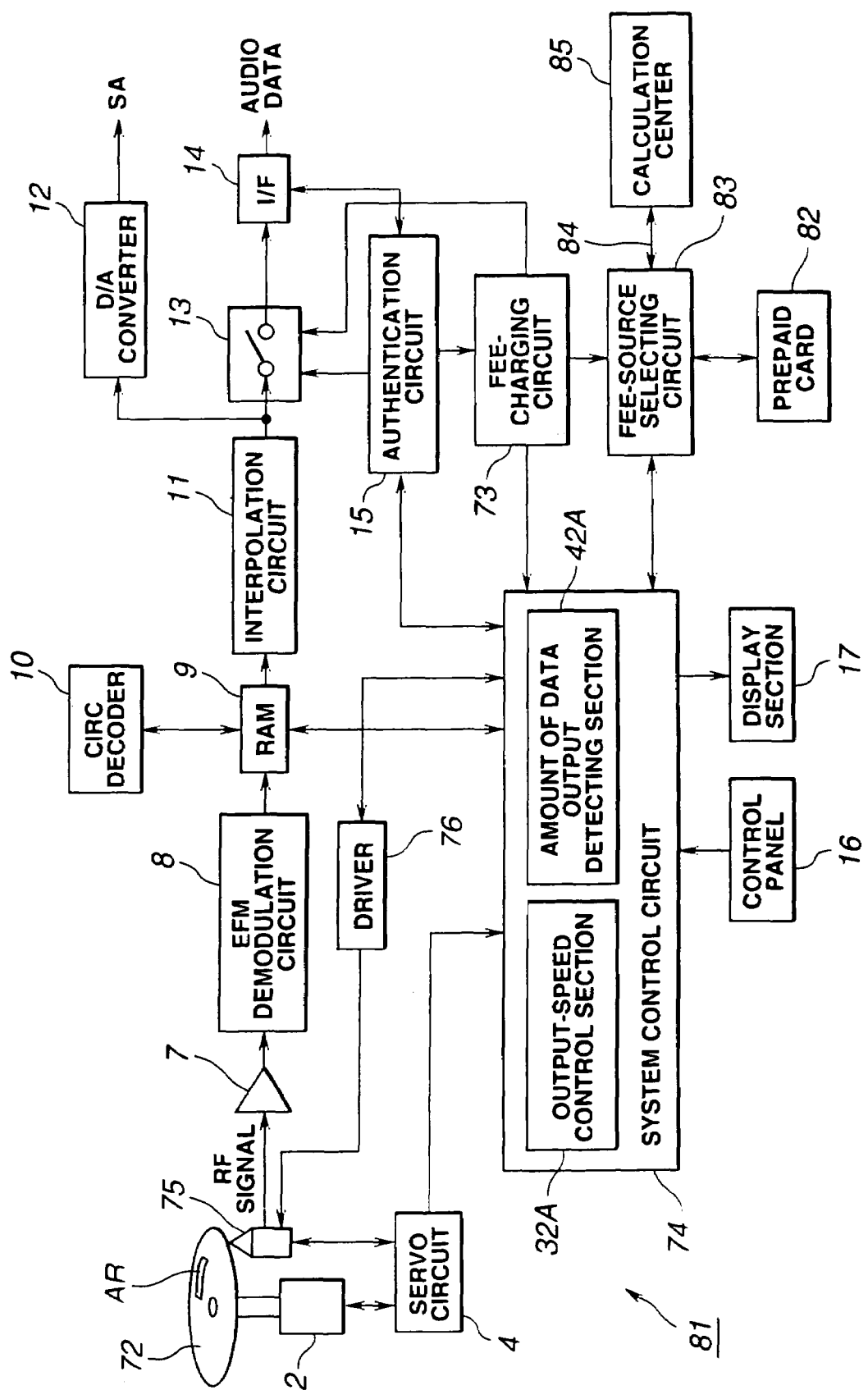
FIG. 14 is a block diagram illustrating the actual structure of an optical disk apparatus to which the present invention is applied.

FIG. 14 is a block diagram illustrating the actual structure of an optical disk apparatus according to the present invention, in which fees are charged on the basis of the amount of the digital audio signal transmitted. In FIG. 14, the components identical to those of the optical disk apparatus 71 illustrated in FIG. 12 are designated as the same reference numerals. These components of the optical disk apparatus 81 will not be described in detail.

In the optical disk apparatus 81, the fee can be charged by using the area AR on an optical disk 72, a prepaid card 82 or a calculation center 85 connected to a telephone line 84. Which method of charging fees the user can select.

The user may operate a control panel 16 to pay the fee from the prepaid card 82. In this case, a system control circuit 74 generates a signal indicating that the fee should be paid by way of the prepaid card 82. This signal is supplied to a fee-source selecting circuit 83. In response to this signal, the fee-source selecting circuit 83 accesses the prepaid card 82 removably held in the optical disk apparatus 81. The data recorded in the card 82 is updated, thus charging the fee. Alternatively, the user may operate the panel 16 to pay the fee at the calculation center 85. If this is the case, the fee-source selecting circuit 83 exchanges data with the calculation center 85 via the telephone line 84 to charge the fee. More precisely, the circuit 83 records two management data items in the prepaid card 82, the data items designating the optical disk 72 and the name of a musical piece, respectively. Further, the circuit 83 transmits these data items to the calculation center 85. The data items are, for example, the management data recorded in the read-in area of the optical disk 72.

With the optical disk apparatus 81 shown in FIG. 14, the user can select one of various methods of charging fees. It is possible to collect fees for the data used and prevent illegal copy of the data, as with the optical disk apparatus 71 illustrated in FIG. 12.

In the optical disk apparatuses described above, the digital audio signal is transmitted to the external apparatus if the type of the external apparatus cannot be determined. The present invention is not limited to these apparatuses. Rather, the transmission of the digital audio signal may be stopped. That is, the external apparatus has not been authenticated, it may be regarded as one that has a copying function. If so, the transmission of the digital audio signal is stopped, whereby illegal copying can be prevented.

In the optical disk apparatuses described above, the transmission of the digital audio signal is stopped if the signal has been reproduced at a speed higher than the standard speed, so that illegal copying of the signal may be prevented. Nonetheless, the present invention is not limited to the apparatuses described above. For example, the signal may be reproduced at a speed four times as high as the standard speed. If so, the speed of transmitting data, based on which it may be determined whether or not the digital audio signal should be transmitted, may be changed, if necessary, so that the transmission of the digital audio signal may be stopped in order to prohibit illegal copying.

In the optical disk apparatuses described above, a fee is charged if the external apparatus is one that has a copying function. The invention is not limited to these apparatuses, For example, a fee may be charged even if the external apparatus has no copying function. Further, a specific fee may be charged for an external apparatus that has a copying function, while a different fee is charged for an external apparatus that does not have a copying function. Still further, the fee may be changed in accordance with the data-transmitting speed or the amount of data transmitted, or in accordance with both the data-transmitting speed and the amount of data transmitted.

In the optical disk apparatuses described above, the digital audio signal is transmitted, in unencrypted form, no matter whether or not a fee is charged for the use of the signal. This invention is not limited to these apparatuses, however. For example, a signal-encrypting process may be effected, along with the fee-charging process. That is, the digital audio signal is encrypted before transmitted to the external apparatus if the external apparatus is one having a copying function. This prevents illegal copying of the digital audio signal.

In the optical disk apparatuses described above, the fee-charging process is switched from one to another, merely in accordance with the type of the external apparatus, the data-transmitting speed or the amount of data transmitted. This invention is not limited to these apparatuses. For example, the fee-charging process may be switched in accordance with the copy permission data. Moreover, fees may be charged on only the use of a special type of an optical disk or specific musical pieces. Further, the rate of charge of the fee may be changed on the basis of the kinds of musical pieces.

The embodiments described above are optical disk apparatuses designed to reproduce data from a compact disk or a CD-R. Nonetheless, this invention is not limited to the embodiments described above. For example, the invention can be applied to an apparatus that reproduces a digital audio signal from a so-called MD (trademark), a digital video disk (DVD), or a similar recording medium and transmits the signal to an external apparatus. In this apparatus, the method of controlling the transmission of the digital audio signal and the method of charging fee may be switched in accordance with whether the recording medium is one for reproducing data only or one for both recording and reproducing data. Moreover, the present invention may be applied to a set-top box, i.e., a satellite broadcasting receiver. It may also be applied to an amplifier, a digital audio tape recorder, a flash memory device, a personal computer or the like, which is connected to a network by an IEEE1394 interface. Furthermore, the invention may be applied to an apparatus that reproduces a digital video signal and transmits the same. In this case, the digital video signal may be one subjected to data compression.

The embodiments described above are optical disk apparatuses, each having an IEEE1394 interface that is connected to an external apparatus. The invention is not limited to the embodiments. The invention can be applied to various apparatuses, which have an interface such as a USB (Universal Serial Bus), or an SCSI interface.

Figure 15:
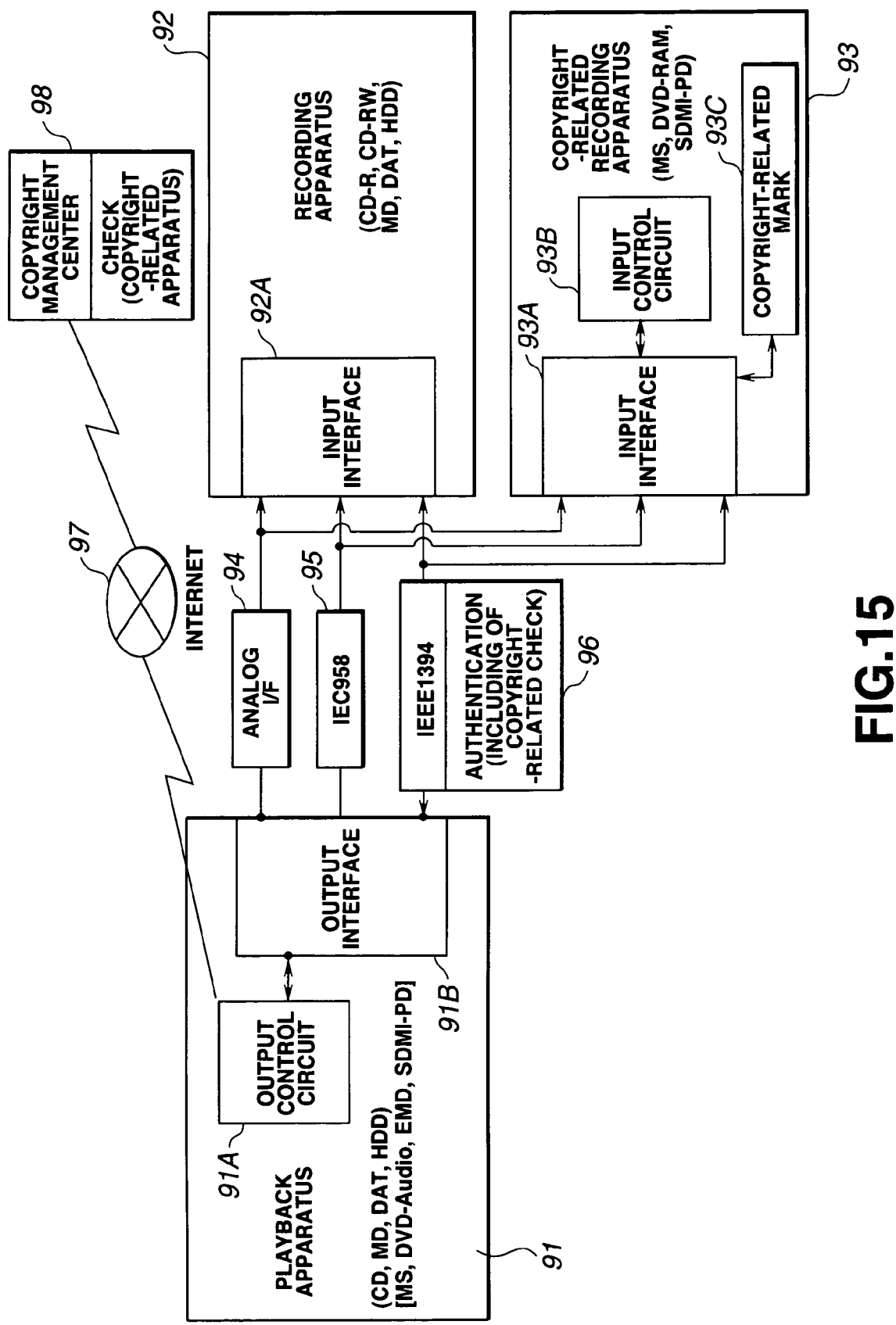
FIG. 15 is a block diagram representing how a playback apparatus having various interfaces is connected to external apparatuses.

FIG. 15 is a block diagram showing a playback apparatus that has various interfaces and recording apparatuses that are external apparatuses. FIG. 15 also illustrates how the playback apparatus and the recording apparatuses are connected. As shown in FIG. 15, the playback apparatus 91 is, for example, a compact disk (CD) player, a digital audio tape recorder (DAT), an MD player, a hard disk drive (HDD), a DVD audio player, an EMD player or a PD (Portable Device) of SDMI (Secure Digital Music Initiative) type. The playback apparatus 91 comprises various interfaces 91B including as an analog interface, an IEC958 interface and an IEEE1394 interface. The recording apparatus 92 is an external apparatus not related to copyright, such as a CD-R recorder, a CD-RW recorder, an MD recorder, a DAT or an HDD. The recording apparatus 93 is an external apparatus related to copyright, such as an MS recorder, a DVD-RAM or an SDMI-PD. The playback apparatus 91 incorporates a recording medium or a semiconductor memory, from which a digital audio signal is reproduced. The digital audio signal is converted to an analog audio signal. When necessary. The analog audio signal is transmitted to the recording apparatuses 92 and 93 through the analog interface bus 94. The digital audio signal is transmitted to the recording apparatuses 92 and 93 through the IEC958 interface bus 95 or the IEEE1394 interface bus 96. The playback apparatus 91 incorporates an output control circuit 91A, which controls the transmission of the analog audio signal and digital audio signal in accordance with which type of an interface 91B is used to transmit these signals.

Figure 16:
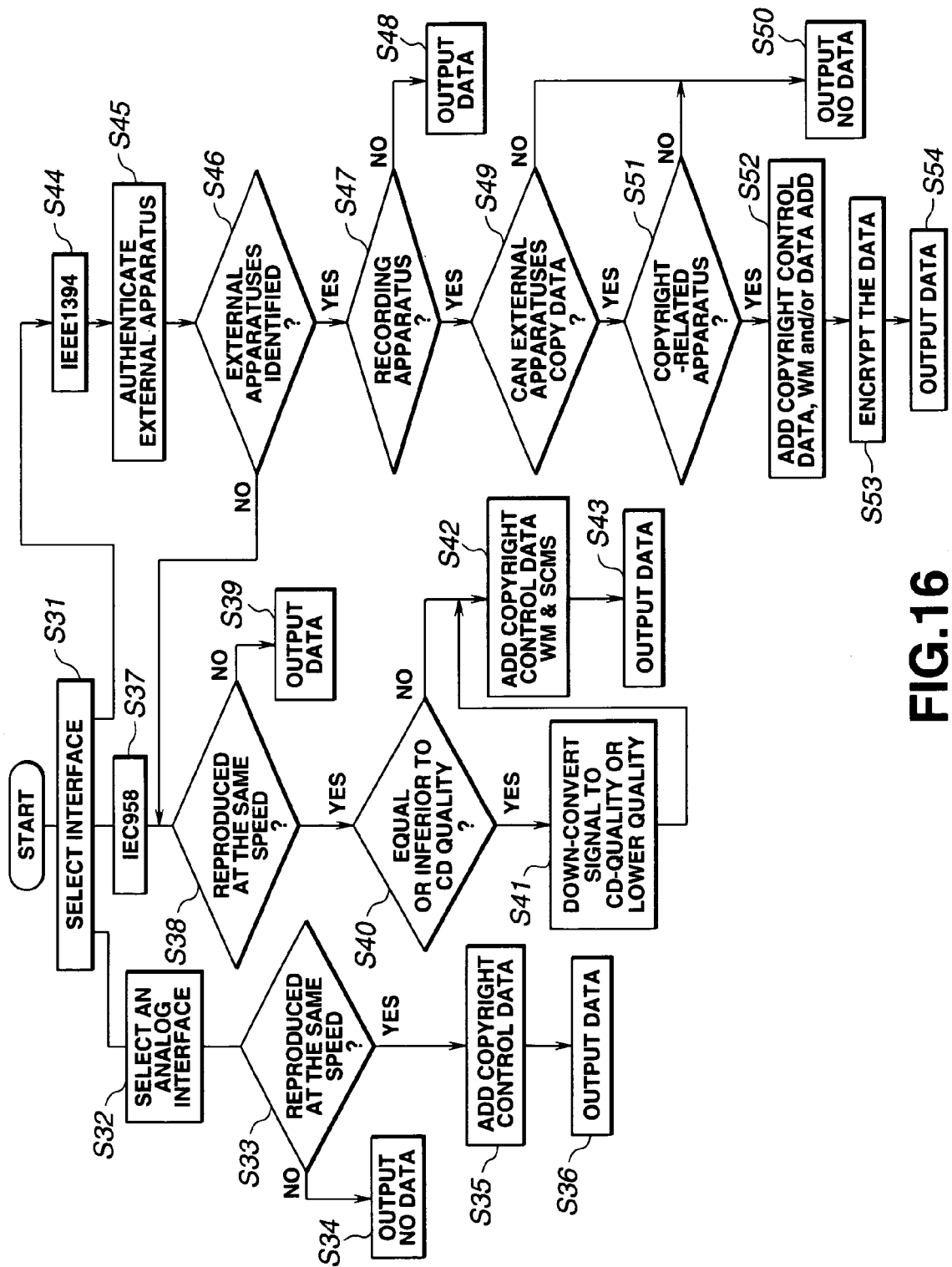
FIG. 16 is a flow chart for explaining the operation of the output control circuit incorporated in the playback apparatus illustrated in FIG. 15.

More specifically, in Step S31 shown in the flow chart of FIG. 16, it is determined which one of the interfaces 91B has been selected in accordance with a request made by the user, the recording apparatus 92 or the recording apparatus 93. If the analog interface has been selected, the output control circuit 91A goes to step S32. If the IEC958 interface has been selected, the output control circuit 91A goes to step S37. If the IEEE1394 interface has been selected, the output control circuit 91A goes to step S44.

In Step S32, the output control circuit 91A sets the interface 91B as the analog interface and goes to Step S33. In Step S33, the output control circuit 91A determines whether or not the digital audio signal has been reproduced in real time, or at the same speed as the music data, from the recording medium or the semiconductor memory. If NO, the circuit 91A goes to Step S34. If YES, it goes to Step S35. In Step S34, the output control circuit 91A stops the transmission of the analog audio signal. In Step S35, the output control circuit 91A adds a copyright control data, e.g., a water mark, to an analog audio signal. The analog audio signal is transmitted from the interface 91B via the analog interface 94 to the interface 92A of the recording apparatus 92 and the interface 93A of the recording apparatus 93. The recording apparatus 92, which is not related to copyright, converts the analog audio signal to a digital audio signal. The digital audio signal is recorded in the recording medium provided in the recording apparatus 92. The recording apparatus 93 that is related to copyright converts the analog audio signal to a digital audio signal, which is recorded in the recording medium or semiconductor memory provided in the recording apparatus 93. At the same time, the recording apparatus 93 receives copyright control data transmitted to it. In the recording apparatus 93, the copyright control data is used to protect the copyright, by inhibiting the copying of the digital audio signal.

In Step S37, the output control circuit 91A sets the IEC985 interface as the interface 91B and goes to Step S38. In Step S38, the output control circuit 91A determines whether or not the digital audio signal has been reproduced at the same speed. If NO, the circuit 91A goes to Step S39. If YES, it goes to Step S40. In Step S39, the output control circuit 91A stops the transmission of the analog audio signal. In Step S40, the output control circuit 91A determines whether or not the digital audio signal reproduced from the recording medium is equal or inferior in quality to CD sound whose sampling frequency is 44.1 kHz and whose quantization number is 16-bit line. If YES, the output control circuit 91A goes to Step S41. If NO, it goes to Step S42. In Step S41, the output control circuit 91A down-converts the digital audio signal to CD-sound quality or lower quality and goes to Step S42. In Step S42, the output control circuit 91A adds copyright control data, such as a water mark or SCMS data, to the digital audio signal and goes to Step S43. In Step S43, the output control circuit 91A transmits the digital audio signal containing the copyright control data, from the interfaces 91B via the IEC958 interface 95 to the interfaces 92A of the recording apparatus 92 and the interface 93A of the recording apparatus 93.

The output control circuit 91A sets the IEEE1394 interface as the interface 91B in Step S44 and goes to Step S45. In Step S45, the output control circuit 91A acquires the apparatus through the IEEE1394 interface 96 the IDs of the recording apparatuses 92 and 93 that are external apparatuses. The circuit 91A goes to Step S46 and determines whether the types of the recording apparatuses can be identified on the basis of their apparatus IDs. If NO, the output control circuit 91A goes to Step S37, whereby Steps S37 to S43 are performed. If YES, the output control circuit 91A goes to Step S47. In Step S47, the circuit 91A determines whether the apparatuses 92 and 93 are recording apparatuses or not. If NO, that is, if the apparatuses 92 and 93 are stereophonic amplifiers or the like, the circuit 91A goes to Step S48. In Step S48, the circuit 91A transmits the digital audio signal to the external apparatus 92 and 93 such as stereophonic amplifiers (not shown) through the IEEE1394 interface 96. If YES, the output control circuit 91A goes to Step S49. In Step S49, the circuit 91A determines whether the recording apparatuses 92 and 93 have a copying function or not. If NO, the output control circuit 91A goes to Step S50, in which it stops the transmission of the digital audio signal. If YES, the output control circuit 91A goes to Step S51. In Step S51, the output control circuit 91A determines whether the recording apparatuses 92 and 93 are copyright-related ones or not. If NO, the output control circuit 91A goes to Step S50, in which it stops the transmission of the digital audio signal. If YES, the output control circuit 91A goes to Step S52. The circuit 91A adds, for example, a water mark and/or a so-called CCI data to the digital audio signal in Step S52 and then goes to Step S53. In Step S53, the output control circuit 91A encrypts the digital audio signal that contains the copyright control data such as a water mark and transmits the digital audio signal, thus encrypted, to the recording apparatuses 92 and 93 through the analog interface 94.

Thus, in the playback apparatus 91, the transmission of an analog or digital audio signal is controlled in accordance with the type of the interface that transmits the analog or digital audio signal to the external apparatuses. This can prevent illegal copying of the signal.

Figure 17:
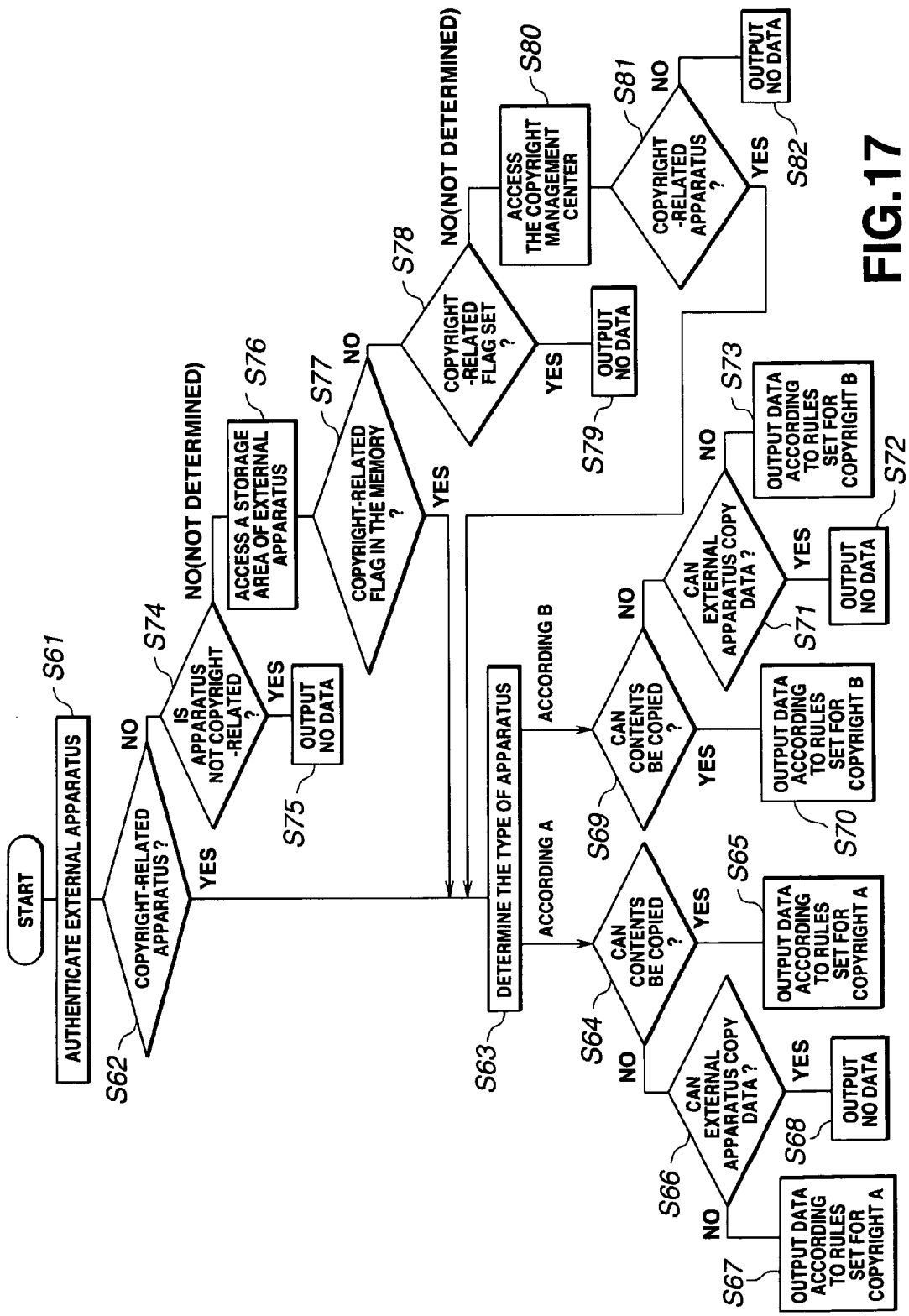
FIG. 17 is another flow chart for explaining the operation of the output control circuit incorporated in the playback apparatus of in FIG. 15.

FIG. 17 is a flow chart for explaining how the output control circuit 91A controls the transmission of the analog or digital audio signal, in accordance with whether the external apparatuses are copyright-related ones or not.

In Step S61, the output control circuit 91A acquires the data through the IEEE1394 interface 96. This data shows that the recording apparatus 93, i.e., one of the external apparatuses, is related to copyright. (Hereinafter, this data will be referred to as "copyright-related apparatus data"). Then, the circuit 91A goes to Step S62.

In Step S62, the output control circuit 91A determines whether the external apparatus is a copyright-related apparatus or not, on the basis of the copyright-related apparatus data. If YES, the circuit 91A goes to Step S63. If it is determined that the external apparatus is not a copyright-related one or it cannot be determined whether the external apparatus is such an apparatus, the circuit 91A goes to Step S74. In Step S63, the output control circuit 91A determines that the apparatus is related to copyright A or copyright B, on the basis of the copyright control data. If the apparatus is related to copyright A, the circuit 91A goes to Step S64. If the apparatus is related to copyright B, the circuit 91A goes to Step S69.

In Step S64, the output control circuit 91A determines whether the digital audio signal reproduced from the recording medium has contents that can be copied or not. If YES, the circuit 91A goes to Step S65. If NO, it goes to Step S66. In Step S65, the circuit 91A transmits the digital audio signal in accordance with the rules set for copyright A. In Step S66, the output control circuit 91A determines whether the external apparatus has a copying function or not. If NO, the circuit 91A goes to step S67, in which it transmits the digital audio signal in accordance with the rules set for copyright A. If YES, the output control circuit 91A goes to Step S68, in which it stops the transmission of the digital audio signal.

If it is determined in Step S74 that the external apparatus is not a copyright-related one, the output control circuit 91A goes to Step S75. In Step S75, the circuit 91A stops the transmission of the digital audio signal. If it is not determined whether the external apparatus is a copyright-related one, the output control circuit 91A goes to Step S76.

In Step S76, the output control circuit 91A accesses a memory 93C provided in, for example, the recording apparatus 93, through the IEEE1394 interface 96. The circuit 91A then goes to Step S77. In Step S77, the output control circuit 91A determines whether or not the memory 93C stores a copyright-related flag (or mark). If YES, the circuit 91A goes to Step S63, in which it performs Steps 63 to Step S72. If NO, the output control circuit 91A goes to Step S78. In Step S78, the circuit 91A determines whether or not a copyright-related flag is set in the memory 93C. If no copyright-related flag is set in the memory 93C or if the external apparatus has no memory 93C and it cannot be determined that a copyright-related flag is set, the circuit 91A goes to Step S80. If YES in Step S78, the circuit 91A goes to Step S79, in which it stops the transmission of the digital audio signal. In Step S80, the output control circuit 91A acquires the apparatus ID from the external apparatus. Using the apparatus ID, the circuit 91A accesses a copyright management center 98 via the Internet 97, acquiring the copyright-related apparatus data. Then, the circuit 91A goes to Step S81. In Step S81, the output control circuit 91A determines, from the copyright-related apparatus data, whether the external apparatus is a copyright-related one or not. If YES, the circuit 91A goes to Step S63 and performs Steps S63 to S73. If NO, the circuit 91A goes to Step S82, in which it stops the transmission of the digital audio signal.

In the playback apparatus 91, the transmission of an analog audio signal or a digital audio signal to the external apparatus is controlled in accordance with whether the external apparatus is a copyright-related one or not. Illegal copying can therefore be prevented.

Figure 18:
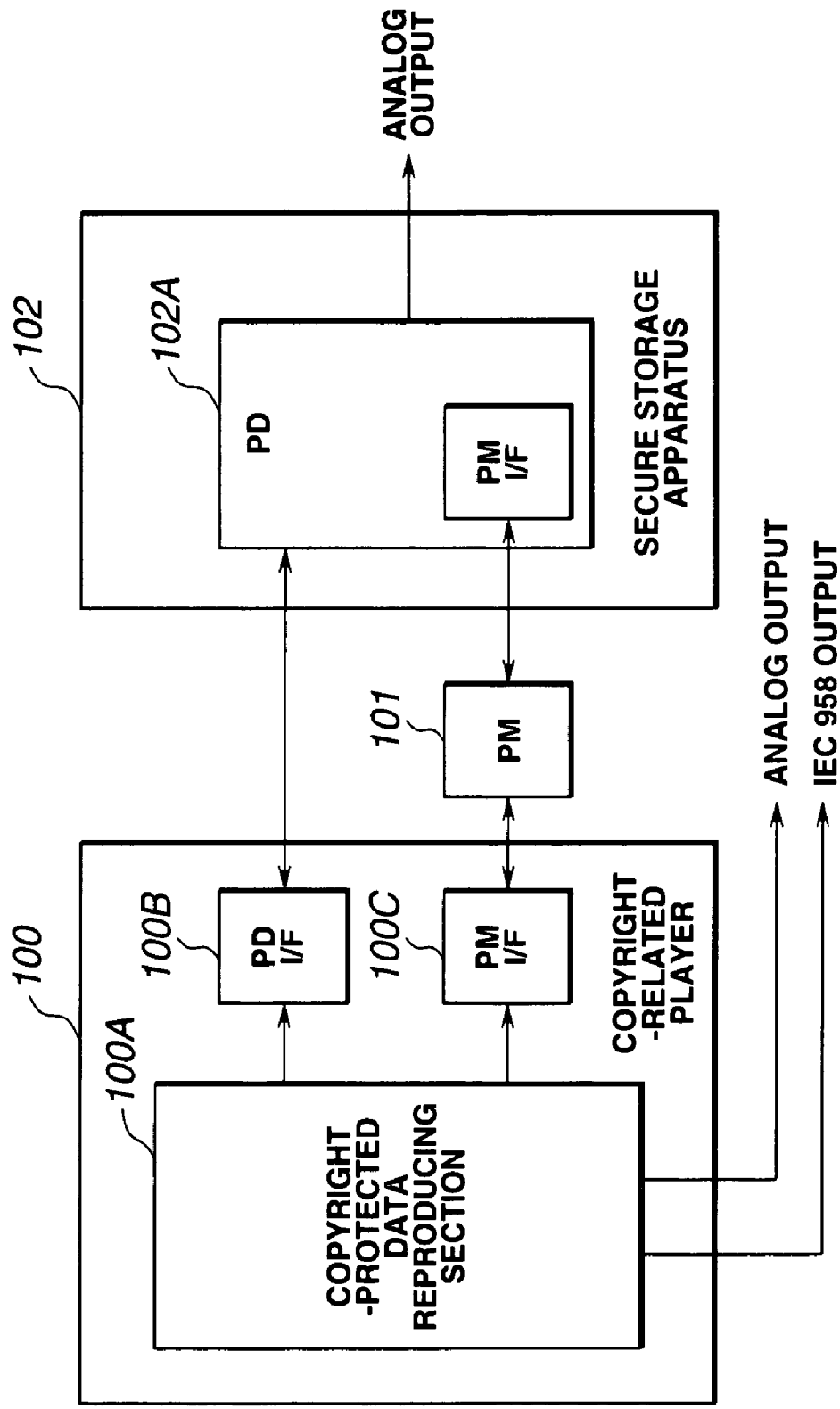
FIG. 18 is a block diagram illustrating how a copyright-related player is connected to an SDMI-PD.

FIG. 18 is a block diagram illustrating how a player related to copyright (hereinafter referred to as "copyright-related player") is connected to a mobile apparatus of SDMI system (hereinafter referred to as "SDMI-PD"). As shown in FIG. 18, the copyright-related player 100 comprises a playback section 100A, a PD interface 100B, and a portable media (PM) interface 100C. The playback section 100A is designed to reproduce copyrighted data. A secure storage apparatus 102 is provided, which comprises a mobile apparatus 102A that incorporates a PM interface. The copyright-related player 100 transmits a digital audio signal to the secure storage apparatus 102 through the PD interface 100B. Alternatively, the copyright-related player 100 records or stores a digital audio signal in the portable medium 101 through the PM interface 101. The mobile apparatus 102A reproduces the digital audio signal from the portable medium 101, converts the signal to an analog audio signal and outputs the analog audio signal. Thus, the copyright-related player 100 controls the transmission of various digital audio signals described above, even if the digital audio signals are transmitted through the portable medium 101.

INDUSTRIAL APPLICABILITY

In the present invention, the transmission of data to an external apparatus is controlled in accordance with which type the apparatus connected to an interface is, whether the data can be copied or not, and so forth. Further, a fee-charging process is controlled in the present invention. Illegal copying of the data can therefore be prevented.

The invention claimed is:

1. A data transmitting apparatus comprising:
an interface connectable to various external apparatuses;
reproducing means for reproducing data;
external-apparatus identifying means for determining a type of an external apparatus connected to said interface and for outputting data representing the type of the external apparatus; and
control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data,
wherein said external-apparatus identifying means determines whether the external apparatus is a storage apparatus that has a storage memory means for storing signals inputted through the interface, and said control means stops the transmission of the first signal to the external apparatus when said external-apparatus identifying means determines that the external apparatus is the storage apparatus having the storage memory means.

2. The data transmitting apparatus according to claim 1, wherein the first signal is a digital audio signal, and the second signal is a signal selected from the group consisting of an analog audio signal, a digital video signal, and an analog video signal.

3. A data transmitting apparatus comprising:
an interface connectable to various external apparatuses;
reproducing means for reproducing data;
external-apparatus identifying means for determining a type of an external apparatus connected to said interface and for outputting data representing the type of the external apparatus; and
control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data,
wherein said external-apparatus identifying means determines a version of the external apparatus, and said control means controls stopping of the transmission of the first signal to the external apparatus through said interface, in accordance with the determined version of the external apparatus.

4. The data transmitting apparatus according to claim 3, wherein the first signal is a digital audio signal, and the second signal is a signal selected from the group consisting of an analog audio signal, a digital video signal, and an analog video signal.

5. A data transmitting apparatus comprising:
an interface connectable to various external apparatuses;
reproducing means for reproducing data;
external-apparatus identifying means for determining a type of an external apparatus connected to said interface and for outputting data representing the type of the external apparatus; and
control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data,
wherein said external-apparatus identifying means determines whether the external apparatus is a copyright-related apparatus that can control reproduction of data based on copyright-related information of the data, and said control means controls the transmission of the first signal to the external apparatus through the interface in accordance with the result of the determination.

6. The data transmitting apparatus according to claim 5, wherein the first signal is a digital audio signal, and the second signal is a signal selected from the group consisting of an analog audio signal, a digital video signal, and an analog video signal.

7. A data transmitting apparatus comprising:
an interface connectable to various external apparatuses;
reproducing means for reproducing data;
external-apparatus identifying means for determining a type of an external apparatus connected to said interface and for outputting data representing the type of the external apparatus; and
control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data, wherein said control means controls the transmission of the first signal to the external apparatus through said interface in accordance with an amount of the first signal to be transmitted to the external apparatus.

8. The data transmitting apparatus according to claim 7, wherein the first signal is a digital audio signal, and the second signal is a signal selected from the group consisting of an analog audio signal, a digital video signal, and an analog video signal.

9. A data transmitting apparatus comprising:

an interface connectable to various external apparatuses;

reproducing means for reproducing data;

external-apparatus identifying means for determining a type of an external apparatus connected to said interface and for outputting data representing the type of the external apparatus; and control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data, wherein said control means controls the transmission of the first signal to the external apparatus through said interface in accordance with a speed at which the first signal is to be transmitted to the external apparatus.

10. The data transmitting apparatus according to claim 9, wherein the first signal is a digital audio signal, and the second signal is a signal selected from the group consisting of an analog audio signal, a digital video signal, and an analog video signal.

11. A data transmitting apparatus comprising:

an interface connectable to various external apparatuses;

reproducing means for reproducing data;

external-apparatus identifying means for determining a type of an external apparatus connected to said interface and for outputting data representing the type of the external apparatus; and control means for controlling stopping of transmission of a first signal derived from the reproduced data to the external apparatus through the interface in accordance with a result of the determining of the type of the external apparatus by said external-apparatus identifying means, wherein data-reproducing means is provided for reproducing the first signal from a recording medium, and said control means controls the transmission of the first signal to the external apparatus through said interface in accordance with the type of the recording medium concurrent with said reproducing means reproducing the reproduced data and outputting a second signal derived from the reproduced data.

12. The data transmitting apparatus according to claim 11, wherein the first signal is a digital audio signal, and the second signal is a signal selected from the group consisting of an analog audio signal, a digital video signal, and an analog video signal.

13. A data transmitting apparatus comprising:

an interface connectable to various external apparatuses;

reproducing means for reproducing data;

external-apparatus identifying means for determining a type of an external apparatus connected to said interface and for outputting data representing the type of the external apparatus;

control means for controlling stopping of transmission of a first signal derived from the reproduced data to the external apparatus through the interface in accordance with a result of the determining of the type of the external apparatus by said external-apparatus identifying means, said control means controlling the stopping of transmission of the first signal concurrent with said reproducing means reproducing the reproduced data and outputting a second signal derived from the reproduced data; and fee-charging means for charging a fee in accordance with the transmission of the first signal through the interface, and said control means controls a fee-charging process performed by the fee-charging means in accordance with the result of determining made by the external-apparatus identifying means of the type of the external apparatus.

14. The data transmitting apparatus according to claim 13, wherein the first signal is a digital audio signal, and the second signal is a signal selected from the group consisting of an analog audio signal, a digital video signal, and an analog video signal.

15. A data transmitting method for use in a data transmitting apparatus having an interface that can be connected to various external apparatuses, said method comprising:

reproducing data from a record medium;

determining a type of an external apparatus connected to the interface and outputting data representing the type of the external apparatus; and controlling stopping of transmission of a first signal derived from the reproduced data to the external apparatus through the interface in accordance with a result of the determining of the type of the external apparatus, said controlling of the stopping of transmission of the first signal being concurrent with said reproducing means reproducing the reproduced data and outputting a second signal derived from the reproduced data, wherein it is determined, in said step of determining the type of the external apparatus, whether the external apparatus is a data storage apparatus that has memory means for storing data input through the interface, and the transmission of the first signal to the external-apparatus is stopped in said step of controlling stopping of transmission of the first signal when said step of determining determines that the external apparatus is the data storage apparatus.

16. The data transmitting method according to claim 15, wherein the first signal is a digital audio signal, and the second signal is a signal selected from the group consisting of an analog audio signal, a digital video signal, and an analog video signal.

17. A data transmitting method for use in a data transmitting apparatus having an interface that can be connected to various external apparatuses, said method comprising:
  reproducing data from a record medium;
  determining a type of an external apparatus connected to the interface and outputting data representing the type of the external apparatus; and
  controlling stopping of transmission of a first signal derived from the reproduced data to the external apparatus through the interface in accordance with a result of the determining of the type of the external apparatus, said controlling of the stopping of transmission of the first signal being concurrent with said reproducing means reproducing the reproduced data and outputting a second signal derived from the reproduced data,
  wherein a version of the external apparatus is determined in said step of determining and the transmission of the first signal to the external apparatus is stopped in determining step of controlling stopping of transmission of the first signal when determining step of determining determines that the external apparatus is a data storage apparatus.

18. The data transmitting method according to claim 17, wherein the first signal is a digital audio signal, and the second signal is a signal selected from the group consisting of an analog audio signal, a digital video signal, and an analog video signal.

19. A data transmitting method for use in a data transmitting apparatus having an interface that can be connected to various external apparatuses, said method comprising:
  reproducing data from a record medium;
  determining a type of an external apparatus connected to the interface and outputting data representing the type of the external apparatus; and
  controlling stopping of transmission of a first signal derived from the reproduced data to the external apparatus through the interface in accordance with a result of the determining of the type of the external apparatus, said controlling of the stopping of transmission of the first signal being concurrent with said reproducing means reproducing the reproduced data and outputting a second signal derived from the reproduced data,
  wherein it is determined, in the step of determining the type of the external apparatus, whether the external apparatus is a copyright-related one, and the transmission of the first signal to the external apparatus through the interface is stopped in said step of controlling stopping of transmission of the first signal in accordance with the result of determination.

20. The data transmitting method according to claim 19, wherein the first signal is a digital audio signal, and the second signal is a signal selected from the group consisting of an analog audio signal, a digital video signal, and an analog video signal.

21. A data transmitting method for use in a data transmitting apparatus having an interface that can be connected to various external apparatuses, said method comprising:
  reproducing data from a record medium;
  determining a type of an external apparatus connected to the interface and outputting data representing the type of the external apparatus; and
  controlling stopping of transmission of a first signal derived from the reproduced data to the external apparatus through the interface in accordance with a result of the determining of the type of the external apparatus, said controlling of the stopping of transmission of the first signal being concurrent with said reproducing means reproducing the reproduced data and outputting a second signal derived from the reproduced data,
  wherein the transmission of the first signal to the external apparatus through the interface is stopped in said step of controlling stopping of the transmission of the first signal in accordance with an amount in which the first signal is to be transmitted to the external apparatus.

22. The data transmitting method according to claim 21, wherein the first signal is a digital audio signal, and the second signal is a signal selected from the group consisting of an analog audio signal, a digital video signal, and an analog video signal.

23. A data transmitting method for use in a data transmitting apparatus having an interface that can be connected to various external apparatuses, said method comprising:
  reproducing data from a record medium;
  determining a type of an external apparatus connected to the interface and outputting data representing the type of the external apparatus; and
  controlling stopping of transmission of a first signal derived from the reproduced data to the external apparatus through the interface in accordance with a result of the determining of the type of the external apparatus, said controlling of the stopping of transmission of the first signal being concurrent with said reproducing means reproducing the reproduced data and outputting a second signal derived from the reproduced data,
  wherein the transmission of the first signal to the external apparatus through the interface is stopped in said step of controlling stopping of the transmission of the first signal in accordance with a speed at which the first signal is to be transmitted to the external apparatus.

24. The data transmitting method according to claim 23, wherein the first signal is a digital audio signal, and the second signal is a signal selected from the group consisting of an analog audio signal, a digital video signal, and an analog video signal.

25. A data transmission method for use in a data transmitting apparatus having an interface that can be connected to various external apparatuses, said method comprising:
  determining a type of an external apparatus connected to the interface and outputting data representing the type of the external apparatus; and
  controlling stopping of transmission of a first signal derived from the reproduced data to the external apparatus through the interface in accordance with a result of the determining of the type of the external apparatus,
  wherein a step of reproducing data is provided for reproducing the first signal from a recording medium, and the transmission of the first signal to the external apparatus through the interface is stopped in said step of controlling stopping the transmission of the first signal in accordance with the recording medium concurrent with said reproducing means reproducing the reproduced data and outputting a second signal derived from the reproduced data.

26. The data transmitting method according to claim 25, wherein the first signal is a digital audio signal, and the second signal is a signal selected from the group consisting of an analog audio signal, a digital video signal, and an analog video signal.

27. A data transmitting apparatus for transmitting data reproduced from a recording medium, comprising:
  an interface for transmitting a first signal derived from the reproduced data; and
  fee-charging control means for performing a fee-charging process in accordance with the transmission of the first signal through said interface and for controlling the transmission of the first signal, wherein said fee-charging control means performs a fee-charging process by updating, in accordance with the fee to be charged, fee data recorded on the recording medium that corresponds to a sum of fees that can be charged for the recording medium, and stops the transmission of the first signal through the interface when the fee data reaches or exceeds a predetermined value concurrent with the reproduced data being reproduced and a second signal derived from the reproduced data being outputted.

28. The data transmitting apparatus according to claim 27, wherein the first signal is a digital audio signal, and the second signal is a signal selected from the group consisting of an analog audio signal, a digital video signal, and an analog video signal.

29. A data transmitting apparatus for transmitting data reproduced from a recording medium, comprising:

an interface for transmitting a first signal derived from the reproduced data; and fee-charging control means for performing a fee-charging process in accordance with the transmission of the first signal through said interface and for controlling the transmission of the first signal, wherein said fee-charging control means performs the fee-charging process by sequentially recording fee data, in accordance with the fee to be charged, in a region provided in the recording medium and corresponding to a sum of fees that can be charged for the recording medium, and stops the transmission of the first signal through said interface when the region corresponding to the sum of fees decreases in size to a predetermined size or becomes smaller than the predetermined size concurrent with the reproduced data being reproduced and a second signal derived from the reproduced data being outputted.

30. The data transmitting apparatus according to claim 29, wherein the first signal is a digital audio signal, and the second signal is a signal selected from the group consisting of an analog audio signal, a digital video signal, and an analog video signal.

31. A data transmitting method for use in a data transmitting apparatus for transmitting, through an interface, a first signal derived from data reproduced from a recording medium, said method comprising:

a fee-charging control step of performing a fee-charging process in accordance with the transmission of the first signal through the interface and controlling the transmission of the first signal, wherein said fee-charging control step performs the fee-charging process by updating, in accordance with the fee to be charged, fee data recorded on the recording medium that corresponds to a sum of fees that can be charged for the recording medium, and stops the transmission of the first signal through the interface when the fee data reaches or exceeds a predetermined value concurrent with the reproduced data being reproduced and a second signal derived from the reproduced data being outputted.

32. The data transmitting method according to claim 31, wherein the first signal is a digital audio signal, and the second signal is a signal selected from the group consisting of an analog audio signal, a digital video signal, and an analog video signal.

33. A data transmitting method for use in a data transmitting apparatus for transmitting, through an interface a first signal derived from data reproduced from a recording medium, said method comprising:

a fee-charging control step of performing a fee-charging process in accordance with the transmission of the first signal through the interface and controlling the transmission of the first signal, wherein said fee-charging control step performs the fee-charging process by sequentially recording fee data, in accordance with the fee to be charged, in a region provided in the recording medium and corresponding to a sum of fees that can be charged for the recording medium, and stops the transmission of the first signal through the interface when the region corresponding to the sum of fees decreases in size to a predetermined size or becomes smaller that the predetermined size concurrent with the reproduced data being reproduced and a second signal derived from the reproduced data being outputted.

34. The data transmitting method according to claim 33, wherein the first signal is a digital audio signal, and the second signal is a signal selected from the group consisting of an analog audio signal, a digital video signal, and an analog video signal.

35. A data recording medium recorded with instructions for carrying out a data transmitting method in a data transmitting apparatus for transmitting, through an interface, a first signal derived from data reproduced from another recording medium, said method comprising:

a fee-charging control step of performing a fee-charging process in accordance with the transmission of the first signal through the interface and controlling the transmission of the first signal, wherein said fee-charging control step performs the fee-charging process by updating, in accordance with the fee to be charged, fee data recorded on the another recording medium that corresponds to a sum of fees that can be charged for access to the another recording medium, and stops the transmission of the first signal through the interface when the fee data reaches or exceeds a predetermined value concurrent with the reproduced data being reproduced and a second signal derived from the reproduced data being outputted.

36. The data recording medium according to claim 35, wherein the first signal is a digital audio signal, and the second signal is a signal selected from the group consisting of an analog audio signal, a digital video signal, and an analog video signal.

37. A data recording medium recorded with instructions for carrying out a data transmitting method in a data transmitting apparatus for transmitting, through an interface, a first signal derived from data reproduced from another recording medium, said method comprising:

a fee-charging control step of performing a fee-charging process in accordance with the transmission of the first signal through the interface and controlling the transmission of the first signal, wherein said fee-charging control step performs the fee-charging process by sequentially recording fee data, in accordance with the fee to be charged, in a region provided in the another recording medium and corresponding to a sum of fees that can be charged for access to the another recording medium, and stops the transmission of the first signal through the interface when the region corresponding to the sum of fees decreases in size to a predetermined size or becomes smaller that the predetermined size concurrent with the reproduced data being reproduced and a second signal derived from the reproduced data being outputted.

38. The data recording medium according to claim 37, wherein the first signal is a digital audio signal, and the second signal is a signal selected from the group consisting of an analog audio signal, a digital video signal, and an analog video signal.

* * * * *

UNITED STATES PATENT AND TRADEMARK OFFICE
CERTIFICATE OF CORRECTION

PATENT NO. : 7,251,327 B1 Page 1 of 1
APPLICATION NO. : 09/581271
DATED : July 31, 2007
INVENTOR(S) : Yoichiro Sako et al.

It is certified that error appears in the above-identified patent and that said Letters Patent is hereby corrected as shown below:

Title Page of the patent, in the Abstract Section (57), line 4, "It the system" should read --The system--.

Column 1, line 24, "Fee" should read --A fee--.

Column 1, line 30, after "amount", insert --of--.

Column 7, line 20, "have" should read --has--.

Column 7, line 22, "have" should read --has--.

Column 7, line 26, "have" should read --has--.

Column 9, line 21, "have" should read --has--.

Column 23, line 18, after "in", insert --the--.

Column 25, line 67, after "interface", insert --,--.

Column 26, line 15, "that" should read --than--.

Column 26, line 67, "that" should read --than--.

Signed and Sealed this

Seventeenth Day of June, 2008

JON W. DUDAS
*Director of the United States Patent and Trademark Office*